(12) United States Patent
Yamasaki et al.

(10) Patent No.: US 7,742,384 B2
(45) Date of Patent: Jun. 22, 2010

(54) OPTICAL HEAD AND OPTICAL DISC DEVICE

(75) Inventors: Fumitomo Yamasaki, Nara (JP); Kousei Sano, Osaka (JP); Yoshiaki Komma, Osaka (JP); Kanji Wakabayashi, Kyoto (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 11/924,225

(22) Filed: Oct. 25, 2007

(65) Prior Publication Data

US 2008/0101199 A1 May 1, 2008

(30) Foreign Application Priority Data

Oct. 25, 2006 (JP) .............................. 2006-289820

(51) Int. Cl.
*G11B 7/00* (2006.01)

(52) U.S. Cl. ............................. 369/112.28; 369/112.27; 369/112.09; 369/112.01; 369/44.12

(58) Field of Classification Search ....................... None
See application file for complete search history.

(56) References Cited

U.S. PATENT DOCUMENTS 6,181,668 B1 * 1/2001 Kajiyama et al. ...... 369/112.02

7,106,682 B2 * 9/2006 Ueyama et al. ........ 369/112.15
2007/0025227 A1 2/2007 Iwata et al.

FOREIGN PATENT DOCUMENTS

| JP | 64-62838 | 3/1989 |
| JP | 2004-281026 | 10/2004 |
| JP | 2007-42150 | 2/2007 |
| WO | 2004/068480 | 8/2004 |

* cited by examiner

*Primary Examiner*—Muhammad N. Edun
(74) *Attorney, Agent, or Firm*—Wenderoth, Lind & Ponack, L.L.P.

(57) ABSTRACT

The present invention aims to provide an optical head and an optical disk device capable of suitably detecting tracking error signals for different types of optical discs.

A polarizing hologram element includes a first area and a second area adjacent to the first area in an area where a beam reflected and diffracted by a BD passes. The first area includes a first transmission area for transmitting many $1^{st}$-order diffracted lights from the BD, a second transmission area adjacent to the first transmission area and closer to an optical axis than the first transmission area, and a third transmission area adjacent to the first and second transmission areas. The second area includes a fourth transmission area for transmitting many $1^{st}$-order diffracted lights from the BD, a fifth transmission area adjacent to the fourth transmission area and closer to the optical axis than the fourth transmission area, and a sixth transmission area adjacent to the fourth and fifth transmission areas.

17 Claims, 28 Drawing Sheets

FIG.6
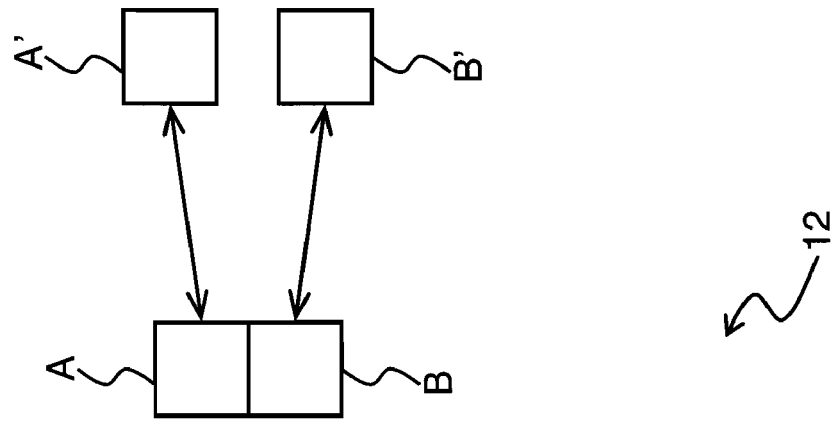
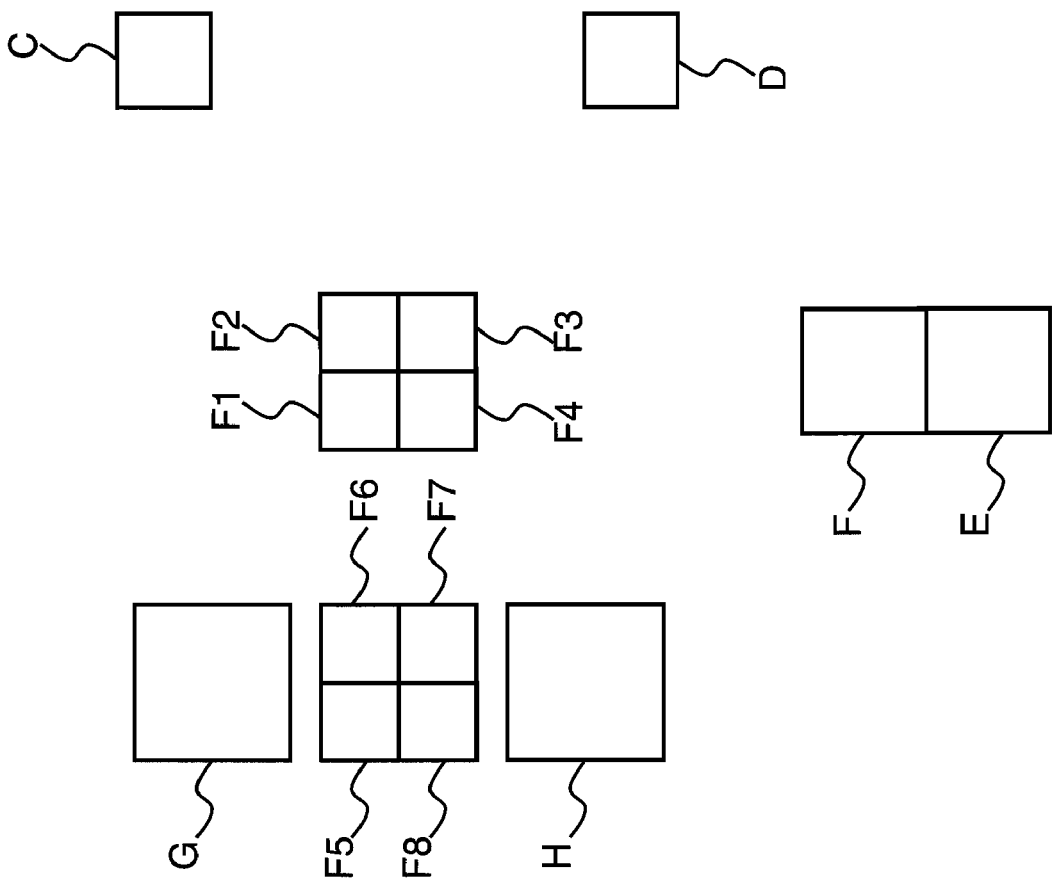

FIG.10
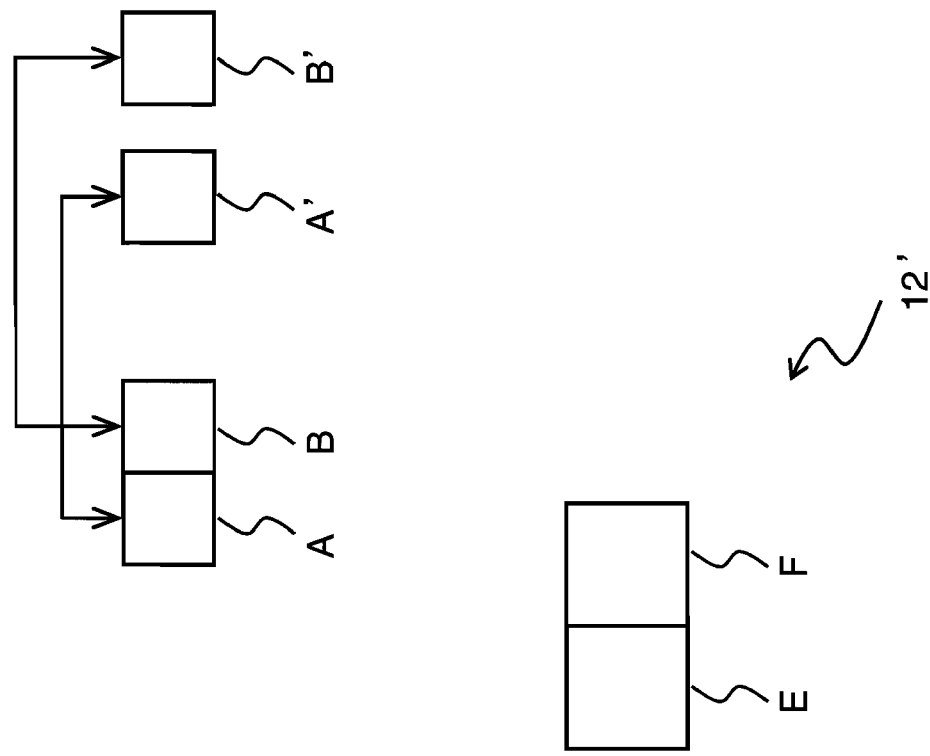
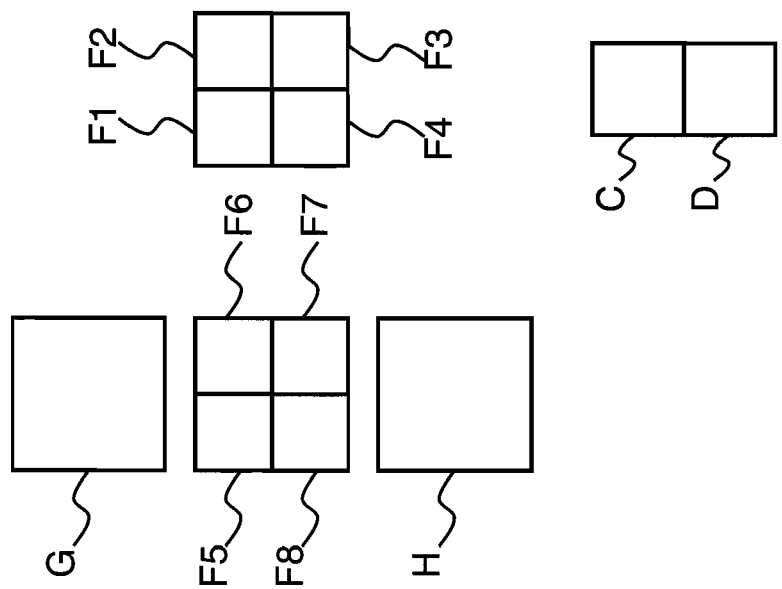

FIG.14
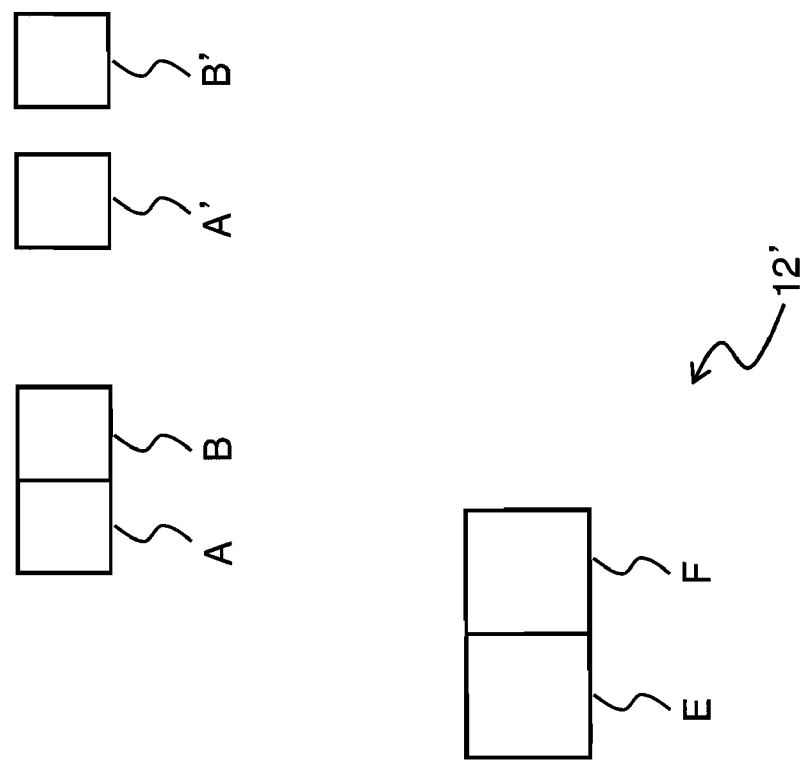
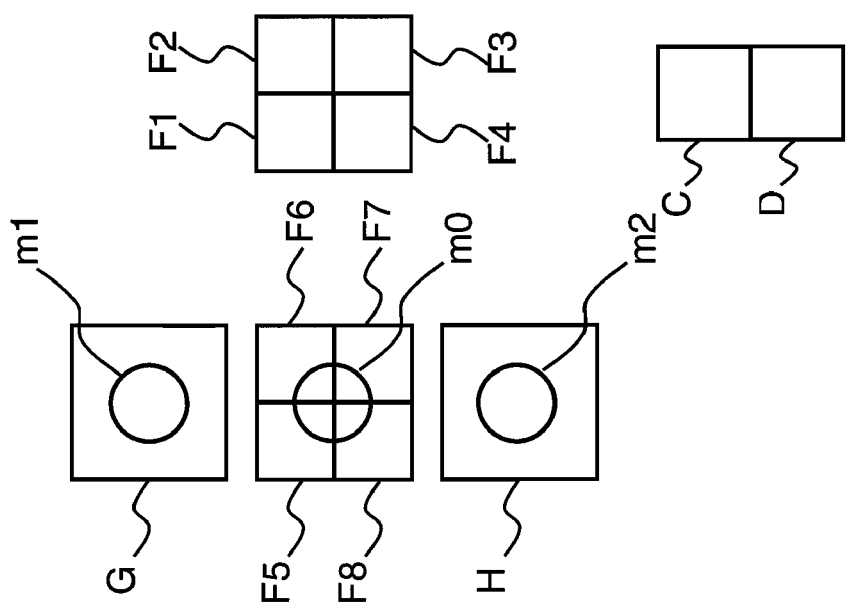

OPTICAL HEAD AND OPTICAL DISC DEVICE

BACKGROUND OF THE INVENTION

1. Field of the Invention

The present invention relates to an optical head including a plurality of light sources having different wavelengths and adapted to optically record or reproduce information on or from information recording media such as a plurality of types of optical discs, and an optical disc device including such an optical disc.

2. Description of the Background Art

In recent years, Blu-ray discs (hereinafter, BDs) which are high-density and large capacity optical information recording media (hereinafter, also referred to as "optical discs") having the same size as CDs (Compact Discs) and DVDs (Digital Versatile Discs) have been put to practical use as blue-violet semiconductor lasers have been put to practical use. This BD is an optical disc whose protective substrate is about 0.1 mm in thickness and on or from which information is recorded or reproduced using a blue-violet semiconductor laser beam source having a wavelength of about 400 nm and an objective lens whose numerical aperture (NA) is increased to 0.85.

HD DVDs whose protective substrate is about 0.6 mm in thickness and on or from which information is recorded or reproduced similarly using a blue-violet semiconductor laser beam source having a wavelength of about 400 nm and an objective lens whose numerical aperture is 0.65 have been also put to practical use. These optical discs on or from which information is recorded or reproduced using blue-violet light sources are collectively called high-density optical discs.

There has been proposed an optical head compatible with optical discs whose protective substrates differ in thickness and capable of recording or reproducing information on or from information recording surfaces of these optical discs by focusing laser beams having different wavelengths using one objective lens.

A construction example of such an optical head is shown in FIG. 23. In FIG. 23, an optical head 130 includes a light source 101 for emitting a blue-violet laser beam, a beam splitter 102, a relay lens 103, a hologram element 104, a dichroic prism 105, a collimator lens 106, an objective lens 107, a diffraction grating 108, a two-wavelength light source 111 for emitting a red laser beam and an infrared laser beam, and a light receiving element 112. Further, a BD 60 is an optical disc whose protective substrate is 0.075 to 0.1 mm in thickness.

Here, an operation of the conventional optical head 130 to record or reproduce information on or from the BD 60 is described. A blue-violet laser beam emitted from the light source 101 is reflected by the beam splitter 102 and passes through the relay lens 103 to be converted into a divergent beam having a larger divergence angle. The blue-violet laser beam having passed through the relay lens 103 is converted into a substantially parallel beam by the collimator lens 106 after passing through the hologram element 104 and being reflected by the dichroic prism 105. The blue-violet laser beam converted into the substantially parallel beam is focused as a light spot on an information recording surface of the BD 60 through the protective substrate by the objective lens 107. The laser beam reflected by the information recording surface of the BD 60 passes through the objective lens 107 and the collimator lens 106 again to be reflected by the dichroic prism 105, and passes through the beam splitter 102 to be introduced to the light receiving element 112 after passing through the hologram element 104 and the relay lens 103.

Here, when the laser beam passes through the hologram element 104, a $0^{th}$-order diffracted light and $\pm 1^{st}$-order diffracted lights are generated. The $\pm 1^{st}$-order diffracted lights of the laser beam on the outward path emitted from the light source 101 are blocked by an aperture (not shown) arranged immediately before the objective lens 107 and, therefore, do not reach the BD 60. On the other hand, the $\pm 1^{st}$-order diffracted lights of the laser beam on the return path reflected by the BD 60 are detected by specified light receiving areas of the light receiving element 112 and are mainly used for the generation of a servo signal.

Here, a focus error signal can be detected using a so-called astigmatism method of obtaining the focus error signal by a four-divided light receiving pattern after astigmatism is given to a laser beam on the return path, for example, by means of a detection lens (not shown) arranged between the beam splitter 102 and the light receiving element 112. It should be noted that a tracking error signal is described later.

Next, an operation of the optical head 130 in the case of recording or reproduction on or from a DVD 70 which is an optical disc whose protective substrate is 0.6 mm in thickness or a CD 80 which is an optical disc whose protective substrate is 1.2 mm in thickness is described with reference to FIG. 24. A red laser beam having a wavelength of 655 nm or an infrared laser beam having a wavelength of 785 nm emitted from the two-wavelength light source 111 is split into a main beam, which is a $0^{th}$-order diffracted light, and sub-beams, which are $\pm 1^{st}$-order diffracted lights, by the diffraction grating 108. The main beam and the sub-beams pass through the dichroic prism 105, are converted into substantially parallel beams by the collimator lens 106, and are focused as light spots on an information recording surface of the DVD 70 or CD 80 through the protective substrate by the objective lens 107. The main beam and the sub-beams reflected by the information recording surface of the DVD 70 or CD 80 pass through the objective lens 107 and the collimator lens 106 again, are reflected by the dichroic prism 105, and pass through the hologram element 104, the relay lens 103 and the beam splitter 102 to be introduced to the light receiving element 112 for the generation of an information signal and a servo signal.

Here, focus error signals used for recording or reproduction on or from the DVD 70 and the CD 80 can be detected using an astigmatism method or the like similar to the focus error signal used for recording or reproduction on or from the aforementioned BD 60. Further, a tracking error signal is detected by a so-called three beam method or a differential push-pull method (DPP method) using the main beam and the sub-beams generated by the diffraction grating 108.

It should be noted that the objective lens 107 has a diffraction structure for focusing a blue-violet laser beam for recording or reproduction on or from the BD 60, a red laser beam for recording or reproduction on or from the DVD 70 and an infrared laser beam for recording or reproduction on or from the CD 80 as minute light spots utilizing wavelength differences.

Accordingly, by using such an optical head 130, information can be recorded or reproduced by focusing laser beams having different wavelengths on different types of optical discs by means of one objective lens 107.

Next, the tracking error signal used for recording or reproduction on or from the BD 60 is described in detail.

Japanese Unexamined Patent Publication No. 2004-281026 (prior art 1) discloses an optical disc device for recording or reproduction on or from a high-density optical disc having a plurality of information recording surfaces like the BD 60. FIG. 25 is a schematic construction diagram of another conventional optical head in the case of recording or reproduction on or from a BD.

In an optical head 230 of FIG. 25, a blue-violet laser beam emitted from a light source 201 and reflected by an information recording surface of a BD 60 passes through a beam splitter 202 to be incident on a hologram element 204 after passing through an objective lens 207 and a collimator lens 206, whereby a plurality of beams are generated. The plurality of beams generated by the hologram element 204 are received by a light receiving element 212 after astigmatism is given thereto while passing through a detection lens 203.

The hologram element 204 has seven kinds of areas 204a to 204g to split the incident laser beam into a $0^{th}$-order diffracted light and $\pm 1^{st}$-order diffracted lights. FIG. 26 is a diagram showing a beam splitting pattern of the hologram element 204 of the conventional optical head 230. The $0^{th}$-order diffracted light x0 is generated by the areas 204a to 204g; the $+1^{st}$-order diffracted light xa by the area 204a; the $+1^{st}$-order diffracted light xb by the area 204b; the $+1^{st}$-order diffracted light xc by the area 204c; the $+1^{st}$-order diffracted light xd by the area 204d; the $+1^{st}$-order diffracted light xe by the area 204e; the $+1^{st}$-order diffracted light xf by the area 204f; and the $+1^{st}$-order diffracted light xg by the area 204g.

FIG. 27 is a diagram showing a state of a laser beam reflected by the BD 60 and reaching the light receiving element 212 of the conventional optical head 230 with respect to the pattern of the light receiving areas. The light receiving element 212 includes a total of ten light receiving sections 212a to 212j.

The light receiving sections 212a to 212d are used to detect a focus error signal and a signal used to reproduce information recorded on an optical disc (BD 60).

On the other hand, the light receiving sections 212e to 212j are used to detect a tracking error signal. The optical head can be miniaturized and the number of operation steps upon assembling the optical head can be reduced by forming the light receiving sections 212a to 212d for detecting the focus error signal and the light receiving sections 212e to 212j for detecting the tracking error signal on the same semiconductor substrate.

The light receiving sections 212a to 212j output current signals I212a to I212j corresponding to amounts of received lights. A focus error signal FE is obtained by a calculation: FE=(I212a+I212c)−(I212b+I212d). Further, a tracking error signal TE is obtained by a calculation: TE=(I212e−I212f)−k (I212g+I212h−I212i−I212j).

Here, a $0^{th}$-order diffracted light x0 is received by the light receiving sections 212a to 212d; a $+1^{st}$-order diffracted light xa by the light receiving section 212e; a $+1^{st}$-order diffracted light xb by the light receiving section 212f; a $+1^{st}$-order diffracted light xc by the light receiving section 212g; a $+1^{st}$-order diffracted light xd by the light receiving section 212h; a $+1^{st}$-order diffracted light xe by the light receiving section 212i; and a $+1^{st}$-order diffracted light xf by the light receiving section 212j. It should be noted that a $+1^{st}$-order diffracted light xg is received by none of the light receiving sections. By adopting such a construction, the variation of the tracking error signal occurring when the position, width and depth of a groove formed in the optical disc (BD 60) vary or when information is recorded on a track can be reduced.

This construction also functions to avoid the incidence of unnecessary lights on the light receiving sections used to detect the tracking error signal when the optical disc (BD 60) has a plurality of information recording surface.

The $0^{th}$-order diffracted light x0 and $+1^{st}$-order diffracted lights xa to xg are generated when the laser beam reflected by the information recording surface of the optical disc is incident on the hologram element 204. However, since the optical disc (BD 60) has two information recording surfaces 60a, 60b (not shown), a beam reflected by the information recording surface 60b different from the information recording surface 60a actually used for recording or reproduction is also incident on the hologram element 204 to generate diffracted lights. A $0^{th}$-order diffracted light y0 and $+1^{st}$-order diffracted lights ya to yg are diffracted lights generated when the laser beam reflected by the information recording surface 60b is incident on the hologram element 204. The $0^{th}$-order diffracted light y0 is generated by the areas 204a to 204g; the $+1^{st}$-order diffracted light ya by the area 204a; the $+1^{st}$-order diffracted light yb by the area 204b; the $+1^{st}$-order diffracted light yc by the area 204c; the $+1^{st}$-order diffracted light yd by the area 204d; the $+1^{st}$-order diffracted light ye by the area 204e; the $+1^{st}$-order diffracted light yf by the area 204f; and the $+1^{st}$-order diffracted light yg by the area 204g.

When the laser beam collected by the objective lens 207 is focused on the information recording surface 60a, there is a large defocus on the information recording surface 60b. Thus, the $0^{th}$-order diffracted light y0 and $+1^{st}$-order diffracted lights ya to yg are also largely defocused on the light receiving element 212. Here, it is designed such that the $0^{th}$-order diffracted light y0 and $+1^{st}$-order diffracted lights ya to yg are incident on none of the light receiving sections 212e to 212j. This is because, if the $0^{th}$-order diffracted light y0 and the $+1^{st}$-order diffracted lights ya to yg are incident on the light receiving sections 212e to 212j, the tracking error signal varies according to the degree of incidence, with the result that a stable tracking control cannot be executed.

The area 204g is defined in a central part of the hologram element 204 shown in FIG. 26, and the $+1^{st}$-order diffracted light xg generated by the area 204g is not used for the generation of the tracking error signal. Here, the $+1^{st}$-order diffracted light xg is diffracted in a direction normal to a diffracting direction of the $+1^{st}$-order diffracted lights xa to xf. Thus, the light receiving sections 212e to 212j can be formed at positions where the $+1^{st}$-order diffracted light xg will not be incident.

It should be noted that $-1^{st}$-order diffracted lights formed at positions conjugate with the $+1^{st}$-order diffracted lights are not incident on the light receiving sections 212e to 212j, either.

International Publication Pamphlet 2004/068480 (prior art 2) discloses an optical head designed to obtain a stable tracking error signal by arranging light receiving sections for $1^{st}$-order diffracted lights in such a manner as not to overlap a maximum or minimum range of divergence of a $0^{th}$-order diffracted light from a recording layer different from a recording layer, on or from which information is to be recorded or reproduced, for a plurality of types of optical discs each including a multitude of layers.

Japanese Unexamined Patent Publication No. H01-62838 (prior art 3) describes an optical head in which an objective lens and a hologram element are united and this united part of the objective lens and the hologram element is movable independently of a light source. FIG. 28 is a schematic construction diagram showing still another conventional optical head in the case of recording or reproduction on or from a DVD.

In an optical head 330 of FIG. 28, a laser beam emitted from a light source 301 is focused on an information recording surface of an optical disc (e.g. DVD 70) by a hologram element 304 and an objective lens 307. The laser beam reflected by the information recording surface of the DVD 70 passes through the objective lens 307 again and is diffracted by the hologram element 304 while passing the respective areas of the hologram element 304 and is introduced to a light receiving element 312.

An actuator 370 executes a tracking control to drive the objective lens 307 so that a light spot focused by the objective lens 307 follows an information track formed in the information recording surface of the DVD 70 in accordance with a tracking error signal obtained from the light receiving element 312. Here, the hologram element 304 is united with the objective lens 307 and driven together therewith by the actuator 370.

Since the hologram element 304 and the objective lens 307 are united, the laser beam reflected by the DVD 70 hardly moves on the hologram element 304 even if the objective lens 307 moves at the time of the tracking control. Accordingly, even if the optical axis of the objective lens 307 is deviated from that of a laser beam emitted from the light source 301 upon detecting a tracking error signal by a one-beam push-pull method, no offset is generated in the tracking error signal.

Such a construction is useful in the case where the one-beam push-pull method is applied to an optical system, whose information track pitches are relatively larger than light spots and a reflected light from which has a small diffraction angle, such as a DVD-RAM.

Prior art 1 discloses the construction of the optical head capable of detecting tracking error signals suitable for high-density optical discs such as BDs. Prior art 3 discloses the construction of the optical head capable of detecting tracking error signals suitable for optical discs whose information track pitches are relatively larger than light spots such as DVD-RAMs. Further, prior art 2 discloses the construction of the optical head capable of detecting a stable tracking error signal for a plurality of types of optical discs each including a multitude of layers.

However, these prior arts mention neither the beam splitting pattern of the hologram element nor the light receiving pattern of the light receiving element, which enables the detection of tracking error signals suitable for all the types of optical discs in the case of an optical head compatible with the recording or production of both high-density optical discs such as BDs and DVDs and CDs.

SUMMARY OF THE INVENTION

In order to solve the above problems, an object of the present invention is to provide an optical head and an optical disc device capable of suitably detecting tracking error signals for different types of optical discs.

One aspect of the present invention is directed to an optical head, comprising a first light source for emitting a first laser beam having a first wavelength between 350 nm and 450 nm; a second light source for emitting a second laser beam having a first wavelength between 600 nm and 700 nm; an objective lens for focusing the first laser beam on a first information recording medium and focusing the second laser beam on a second information recording medium different from the first information recording medium; a beam splitting portion arranged on an optical path common to the first laser beam reflected and diffracted by the first information recording medium and the second laser beam reflected and diffracted by the second information recording medium for splitting the respective laser beams into a plurality of beams; and a light receiving portion for receiving the plurality of beams divided by the beam splitting portion, wherein the beam splitting portion includes a first area and a second area divided by a first line passing through the optical axis of the objective lens and parallel to an information track of the first information recording medium in an area where the beam reflected and diffracted by the first information recording medium passes; the first area includes a first transmission area for transmitting many $1^{st}$-order diffracted lights from the first information recording medium, a second transmission area adjacent to the first transmission area and closer to the optical axis than the first transmission area and a third transmission area adjacent to the first and second transmission areas; and the second area includes a fourth transmission area for transmitting many $1^{st}$-order diffracted lights from the first information recording medium, a fifth transmission area adjacent to the fourth transmission area and closer to the optical axis than the fourth transmission area and a sixth transmission area adjacent to the fourth and fifth transmission areas.

Another aspect of the present invention is directed to an optical head, comprising a first light source for emitting a first laser beam having a first wavelength; a second light source for emitting a second laser beam having a first wavelength; an objective lens for focusing the first laser beam on a first information recording medium and focusing the second laser beam on a second information recording medium different from the first information recording medium; a beam splitting portion arranged on an optical path common to the first laser beam reflected and diffracted by the first information recording medium and the second laser beam reflected and diffracted by the second information recording medium for splitting the respective laser beams into a plurality of beams; and a light receiving portion for receiving the plurality of beams divided by the beam splitting portion, wherein the beam splitting portion includes a first area and a second area divided by a first line passing through the optical axis of the objective lens and parallel to an information track of the first information recording medium in an area where the beam reflected and diffracted by the first information recording medium passes, a first division area for receiving many $1^{st}$-diffracted lights from the first information recording medium in the first area, a second division area for receiving many $1^{st}$-order diffracted lights from the first information recording medium in the second area, a third division area closer to the optical axis than the first division area in the first area and outside the first division area, a fourth division area closer to the optical axis than the second division area in the second area and outside the second division area, a fifth division area in the first area and outside the first and third division areas, and a sixth division area in the second area and outside the second and fourth division areas.

Still another aspect of the present invention is directed to an optical disc device, comprising the above optical head; a motor for driving and rotating an information recording medium; and a controller for controlling the optical head and the motor.

BRIEF DESCRIPTION OF THE DRAWINGS

FIG. 6 is a diagram showing a pattern of light receiving areas of a light receiving element in the first embodiment of the invention, FIG. 10 is a diagram showing a pattern of light receiving areas of a light receiving element in a second embodiment of the invention, FIG. 14 is a diagram showing a state of a laser beam reflected by a CD and reaching the light receiving element with respect to the pattern of the light receiving areas of the light receiving element in the second embodiment.

DETAILED DESCRIPTION OF THE PREFERRED EMBODIMENTS OF THE INVENTION

Hereinafter, embodiments of the present invention are described with reference to the accompanying drawings. It should be appreciated that the following embodiments are merely specific examples of the present invention and do not limit the technical scope of the present invention.

First Embodiment

Figure 1:
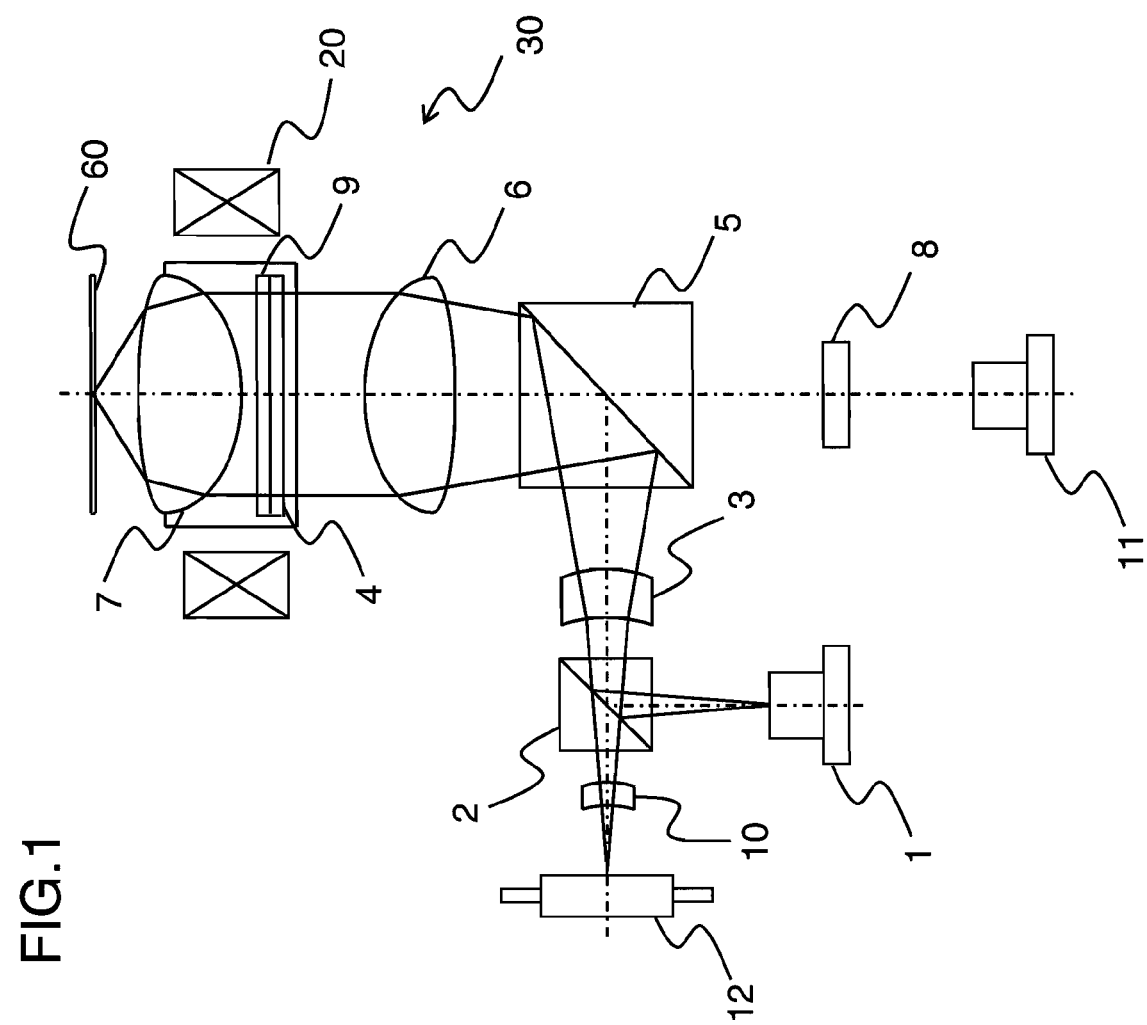
FIG. 1 is a schematic construction diagram of an optical head in the case of recording or reproduction on or from a BD in a first embodiment of the invention.

FIG. 1 is a schematic construction diagram of an optical head according to a first embodiment of the present invention.

In FIG. 1, an optical head 30 includes a light source 1 for emitting a blue-violet laser beam, a beam splitter 2, a relay lens 3, a polarizing hologram element 4, a dichroic prism 5 for reflecting lights having a specified wavelength or shorter, a collimator lens 6, an objective lens 7, a diffraction grating 8, a quarter wave plate 9, a detection lens 10, a two-wavelength light source 11 for emitting a red laser beam and an infrared laser beam, a light receiving element 12 for receiving laser beams, and an actuator 20 for integrally driving the objective lens 7, the polarizing hologram element 4 and the quarter wave plate 9.

A BD 60 is an optical disc whose protective substrate is 0.075 to 0.1 mm in thickness.

An operation of the optical head 30 to record or reproduce information on or from a BD 60 is described. A blue-violet laser beam having a wavelength of 405 nm and emitted from the light source 1 is reflected by the beam splitter 2 and passes through the relay lens 3 to be converted into a divergent beam having a different NA. The blue-violet beam having passed through the relay lens 3 is converted into a substantially parallel beam by the collimator lens 6 after being reflected by the dichroic prism 5, and is converted from a linearly polarized beam into a circularly polarized beam by the quarter wave plate 9 after passing through the polarizing hologram element 4. Thereafter, the blue-violet laser beam is focused as a light spot on an information recording surface of the BD 60 through the protective substrate by the objective lens 7.

The laser beam reflected by the information recording surface of the BD 60 passes through the objective lens 7 again, is split into a $0^{th}$-order diffracted light and $1^{st}$-order diffracted lights by the polarizing hologram element 4 and passes through the collimator lens 6 after being converted into a linearly polarized beam different from the one on the outward path by the quarter wave plate 9. Thereafter, the blue-violet laser beam is reflected by the dichroic prism 5, passes through the relay lens 3 and the beam splitter 2 and is introduced to the light receiving element 12 after astigmatism is given thereto by the detection lens 10.

Next, operations of the optical head 30 in the case of recording or reproduction on or from a DVD 70 which is an optical disc whose protective substrate is 0.6 mm in thickness and in the case of recording or reproduction on or from a CD 80 which is an optical disc whose protective substrate is 1.2 mm in thickness are respectively described with reference to FIGS. 2 and 3.

Figure 2:
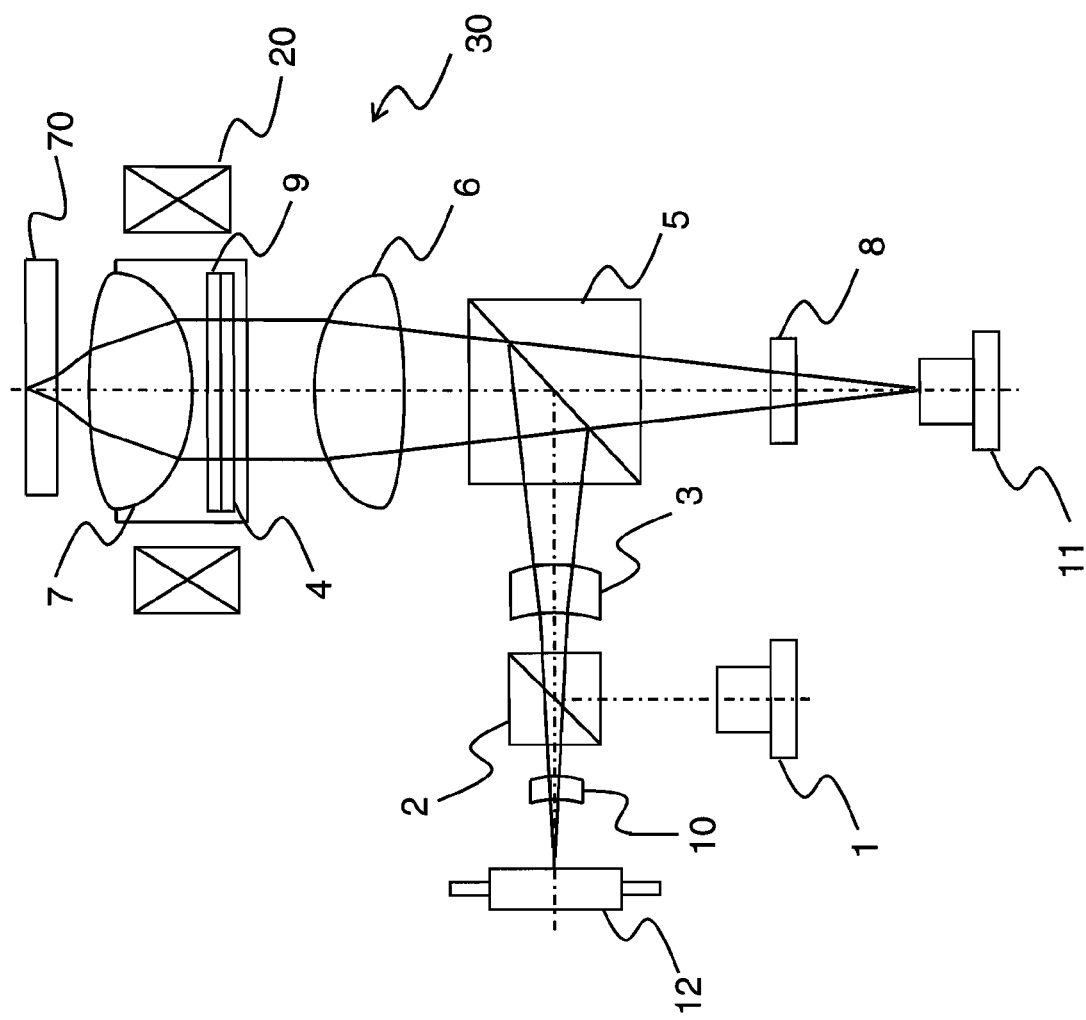
FIG. 2 is a schematic construction diagram of the optical head in the case of recording or reproduction on or from a DVD in the first embodiment of the invention.

In FIG. 2, a red laser beam having a wavelength of 655 nm and emitted from the two-wavelength light source 11 passes through the diffraction grating 8 and the dichroic prism 5 and is converted into a substantially parallel beam by the collimator lens 6. The red laser beam converted into the substantially parallel beam is converted from a linearly polarized beam into a circularly polarized beam by the quarter wave plate 9 after passing through the polarizing hologram element 4. Thereafter, the red laser beam is focused as a light spot on an information recording surface of the DVD 70 through the protective substrate by the objective lens 7.

The laser beam reflected by the information recording surface of the DVD 70 passes through the objective lens 7 again, and is split into a $0^{th}$-order diffracted light and $1^{st}$-order diffracted lights by the polarizing hologram element 4 and passes through the collimator lens 6 after being converted into a linearly polarized beam different from the one on the outward path by the quarter wave plate 9. Thereafter, the red laser beam is reflected by the dichroic prism 5, passes through the relay lens 3 and the beam splitter 2 and is introduced to the light receiving element 12 after astigmatism is given thereto by the detection lens 10.

Figure 3:
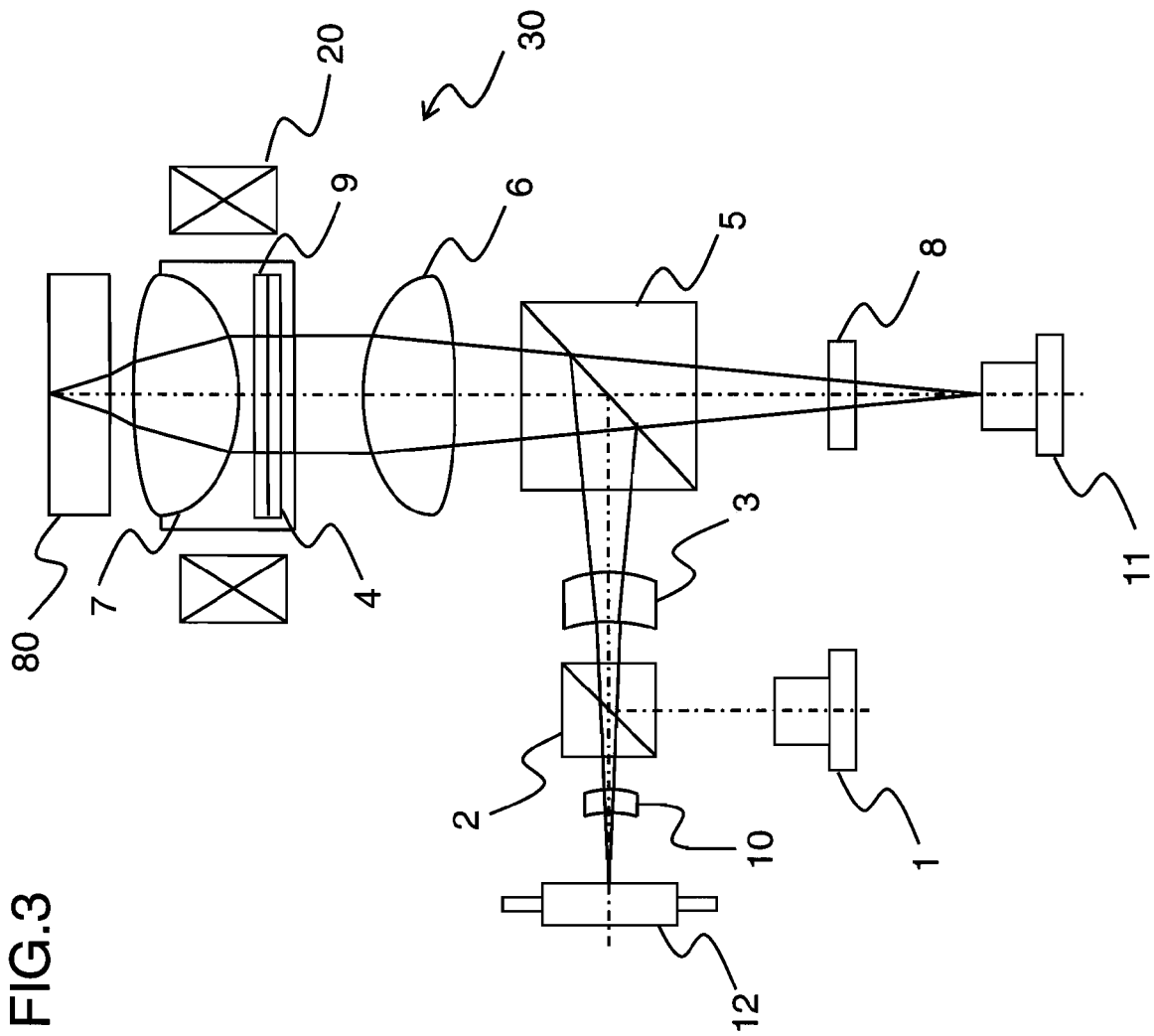
FIG. 3 is a schematic construction diagram of the optical head in the case of recording or reproduction on or from a CD in the first embodiment of the invention.

Similarly, in FIG. 3, an infrared laser beam having a wavelength of 785 nm and emitted from the two-wavelength light source 11 passes through the dichroic prism 5 and is converted into a substantially parallel beam by the collimator lens 6 after being split into a main beam, which is a $0^{th}$-order diffracted light, and sub-beams, which are $1^{st}$-order diffracted lights. The infrared laser beam converted into the substantially parallel beam is converted from a linearly polarized beam into a circularly polarized beam by the quarter wave plate 9 after passing through the polarizing hologram element 4. Thereafter, the infrared laser beam is focused as a light spot on an information recording surface of the CD 80 through the protective substrate by the objective lens 7.

The laser beam reflected by the information recording surface of the CD 80 passes through the objective lens 7 again, and passes through the polarizing hologram element 4 and the collimator lens 6 after being converted into a linearly polarized beam different from the one on the outward path by the quarter wave plate 9. Thereafter, the infrared laser beam is reflected by the dichroic prism 5, passes through the relay lens 3 and the beam splitter 2 and is introduced to the light receiving element 12 after astigmatism is given thereto by the detection lens 10.

Here, the objective lens 7 has a diffraction structure for focusing a blue-violet laser beam for recording or reproduction on or from the BD 60, a red laser beam for recording or reproduction on or from the DVD 70 and an infrared laser beam for recording or reproduction on or from the CD 80 as minute light spots utilizing wavelength differences.

However, the present invention is not limited to optical heads using objective lenses having such a diffraction structure. It is apparent that the objective lens 7 may be a refraction type objective lens utilizing wavelength dispersion characteristics of a plurality of glass materials or a combination lens including a plurality of diffraction-type/refraction-type lenses.

The polarizing hologram element 4 has a function of transmitting substantially all of the blue-violet laser beam, the red laser beam and the infrared laser beam on the outward paths emitted from the light sources and diffracting parts of the blue-violet laser beam and the red laser beam on the return paths, which were reflected by the optical discs and converted into the linearly polarized beams in a direction normal to those on the outward paths by the quarter wave plate 9 while transmitting substantially the entire infrared laser beam, which was reflected by the optical disc and converted into the linearly polarized beam in a direction normal to the one on the outward path by the quarter wave plate 9. However, the present invention is not limited to such a polarizing hologram element. For example, it is preferable that the polarizing hologram element 4 has a function of diffracting parts of the infrared laser beam on the return path. Since the beam splitting pattern of the polarizing hologram element 4 and the grating pitches of the respective areas are commonly used for a blue-violet laser and a red laser, the red laser has a larger diffraction angle θ substantially in proportion to wavelength than the blue-violet laser from a relationship defined by the following equation (1).

$$m\lambda = d \cdot \sin\theta \quad (1)$$

where m: diffraction order number, λ: laser wavelength, d: grating pitch and θ: diffraction angle.

On the other hand, the diffraction grating 8 of this embodiment has wavelength selectivity of generating the $0^{th}$-order diffracted light and the $\pm 1^{st}$-order diffracted lights from the infrared laser beam emitted from the two-wavelength light source 11 and transmitting substantially the entire red laser beam. However, the present invention is not limited to such a diffraction grating and the diffraction grating may be a simple diffraction grating for also generating the $0^{th}$-order diffracted light and the $\pm 1^{st}$-order diffracted lights from the red laser beam.

Figure 4:
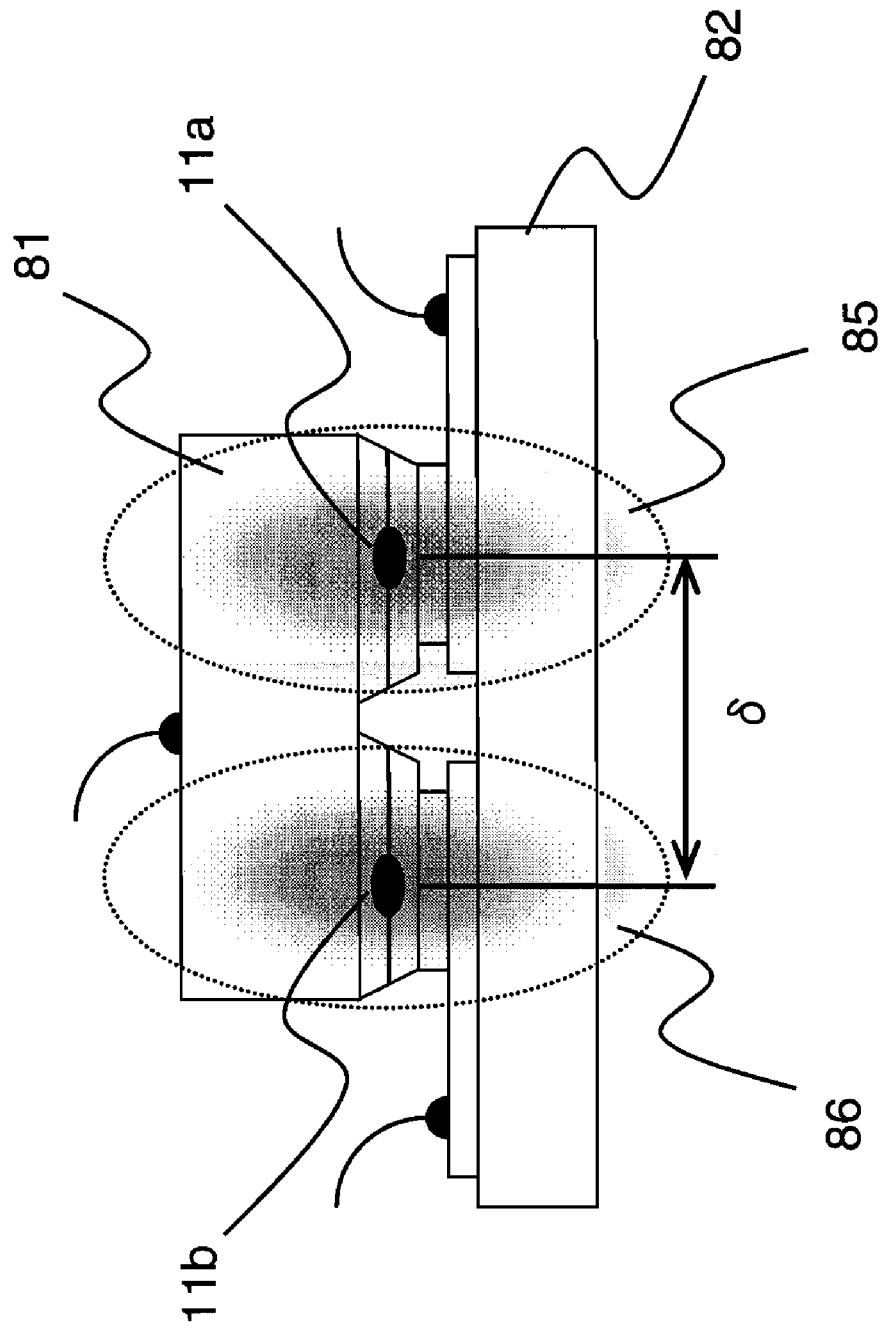
FIG. 4 is a schematic construction diagram of a two-wavelength light source in the first embodiment of the invention.

FIG. 4 is a schematic construction diagram of the two-wavelength light source in the first embodiment of the present invention. Here, the two-wavelength light source 11 is a monolithic two-wavelength laser in which an emission point 11a for emitting the red laser beam and an emission point 11b for emitting the infrared laser beam therein are at a specified distance 6 as shown in FIG. 4. The monolithic two-wavelength laser is constructed such that, for example, a GaAs substrate 81 is formed on a submount 82 and a red laser beam 85 and an infrared laser beam 86 are emitted from one laser chip as shown in FIG. 4.

Beside the monolithic type as shown in FIG. 4, the two-wavelength light source may be of the hybrid type in which two laser chips are juxtaposed. Generally, the emission point 11a of the red laser beam 85 and the emission point 11b of the infrared laser beam 86 cannot coincide with each other in either type. Accordingly, if the optical axis of the blue-violet laser beam emitted from the light source 1 and that of the red laser beam emitted from the two-wavelength light source 11 are aligned with the optical axis of the objective lens 7, the optical axis of the infrared laser beam emitted from the two-wavelength light source 11 cannot be aligned with those. At this time, the infrared laser beam is incident off-axis on the objective lens 7. However, since the distance 5 between the emission points is very short, it has only a small influence on the focusing performance of the objective lens 7.

Next, the functions of the polarizing hologram element 4 and the light receiving element 12 in the case of recording or reproduction on or from the BD 60 are described in detail with reference to FIGS. 5 to 7.

Figure 5:
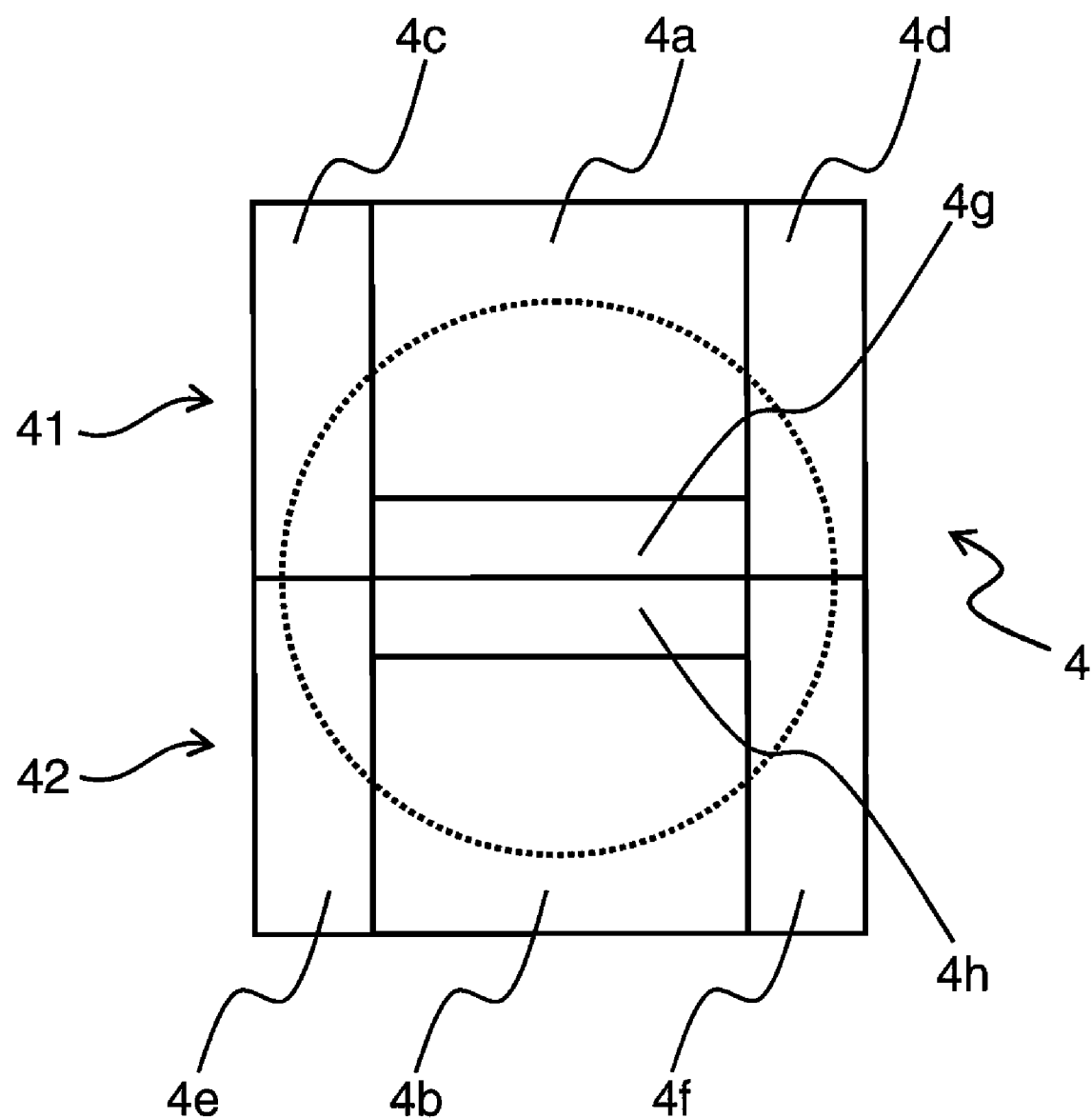
FIG. 5 is a diagram showing a beam splitting pattern of a polarizing hologram element in the first embodiment of the invention.

FIG. 5 is a diagram showing the beam splitting pattern of the polarizing hologram element 4 in the first embodiment of the present invention. The polarizing hologram element 4 has eight kinds of areas 4a to 4h and splits a blue-violet laser beam (blue-violet laser beam on the return path reflected by the BD 60 in this embodiment), which is a specified linearly polarized beam, into a $0^{th}$-order diffracted light and $\pm 1^{st}$-order diffracted lights. The $0^{th}$-order diffracted light j0 is generated by the areas 4a to 4h; the $+1^{st}$-order diffracted light ja by the area 4a; the $+1^{st}$-order diffracted light jb by the area 4b; the $+1^{st}$-order diffracted light jc by the area 4c; the $+1^{st}$-order diffracted light jd by the area 4d; the $+1^{st}$-order diffracted light je by the area 4e; the $+1^{st}$-order diffracted light jf by the area 4f; the $+1^{st}$-order diffracted light jg by the area 4g; and the $+1^{st}$-order diffracted light jh by the area 4h.

The polarizing hologram element 4 also includes a first area 41 and a second area 42 adjacent to the first area 41 in an area where the beam reflected and diffracted by the BD 60 passes. The first area 41 includes the area 4a (first transmission area) for transmitting many $1^{st}$-order diffracted lights from the BD 60, the area 4g (second transmission area) adjacent to the area 4a and close to the optical axis than the area 4a, and the areas (third transmission area) 4c, 4d adjacent to the areas 4a and 4g. The second area 42 includes the area 4b (fourth transmission area) for transmitting many $1^{st}$-order diffracted lights from the BD 60, the area 4h (fifth transmission area) adjacent to the area 4b and close to the optical axis than the area 4b, and the areas (sixth transmission area) 4e, 4f adjacent to the areas 4b and 4h.

It should be noted that the polarizing hologram element 4 is an example of a diffractive element for transmitting parts of first and second laser beams passing therethrough while diffracting the other parts.

FIG. 6 is a diagram showing the pattern of light receiving areas of the light receiving element 12 in the first embodiment of the present invention. The light receiving element 12 includes a total of eighteen light receiving sections F1 to F8, A to H and A', A'. Here, although the light receiving sections A, A' and the light receiving sections B, B' are arranged at different positions, each pair can be assumed to be one light receiving section and has one output since they are connected by wiring.

The light receiving sections F1 to F4 are used to detect focus error signals for the BD 60 and the DVD 70 and signals for the reproduction of information recorded in optical discs. The light receiving sections F5 to F8 are used to detect a focus error signal for the CD 80 and signals for the reproduction of information recorded in optical discs. On the other hand, the light receiving sections A to D are used to detect a tracking error signal of the BD 60; the light receiving sections A, B, E and F are used to detect a tracking error signal of the DVD 70; and the light receiving sections G, H are used to detect a tracking error signal of the CD 80.

The optical head can be miniaturized and the number of operation steps upon assembling the optical head can be reduced by forming the light receiving sections F1 to F8 for detecting the focus error signals and the light receiving sections A to H for detecting the tracking error signals on the same semiconductor substrate.

The light receiving sections F1 to F8 and A to H respectively output current signals IF1 to IF8 and IA to IH corresponding to amounts of received lights. A focus error signal FE used for the recording or reproduction on or from the BD 60 is given by a calculation defined by the following equation (2):

$$FE = (IF1 + IF3) - (IF2 + IF4) \quad (2).$$

Further, a tracking error signal TE can be given by a calculation defined by the following equation (3):

$$TE = (IA - IB) - k(IC - ID) \quad (3)$$

where k is a constant.

Figure 7:
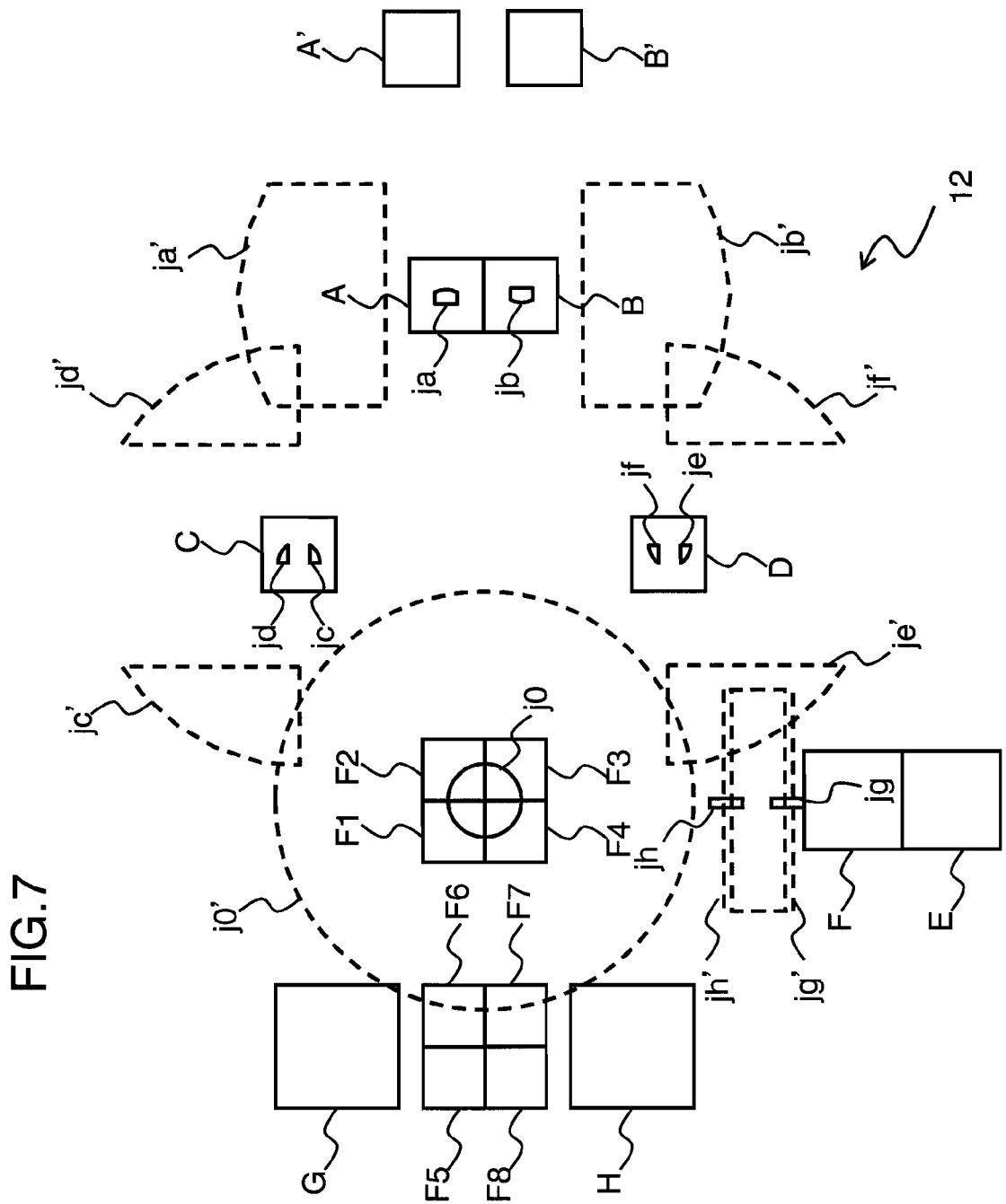
FIG. 7 is a diagram showing a state of a laser beam reflected by a BD and reaching the light receiving element with respect to the pattern of the light receiving areas of the light receiving element in the first embodiment.

FIG. 7 is a diagram showing a state of a laser beam reflected by the BD 60 and reaching the light receiving element 12 with respect to the pattern of the light receiving areas of the light receiving element 12 in the first embodiment. A $0^{th}$-order diffracted light j0 is received by the four light receiving sections F1 to F4; a $+1^{st}$-order diffracted light ja by the light receiving section A; a $+1^{st}$-order diffracted light jb by the light receiving section B; $+1^{st}$-order diffracted lights jc, jd by the light receiving section C; and $+1^{st}$-order diffracted lights je, jf by the light receiving section D. It should be noted that $+1^{st}$-order diffracted lights jg, jh are received by none of the light receiving sections. By adopting such a construction, the variation of the tracking error signal occurring when the position, width and depth of a groove formed in the BD 60 vary or when information is recorded in a track can be reduced.

This construction also functions to avoid the incidence of unnecessary lights on the light receiving sections used to detect the tracking error signal in the case where the BD 60 has a plurality of information recording surfaces.

The $0^{th}$-order diffracted light j0 and $+1^{st}$-order diffracted lights ja to jh are diffracted lights generated when the blue-violet laser beam reflected by the information recording surface of the BD 60 is incident on the polarizing hologram element 4. Since the BD 60 has two information recording surfaces 60a, 60b (not shown), a beam reflected by the information recording surface 60b different from the information recording surface 60a actually used for recording or reproduction is also incident on the polarizing hologram element 4 to generate diffracted lights. A $0^{th}$-order diffracted light j0' and $+1^{st}$-order diffracted lights j' to jh' are diffracted lights generated when the blue-violet laser beam reflected by the information recording surface 60b is incident on the polarizing hologram element 4. The $0^{th}$-order diffracted light j0' is generated by the areas 4a to 4h; the $+1^{st}$-order diffracted light ja' by the area 4a; the $+1^{st}$-order diffracted light jb' by the area 4b; the $+1^{st}$-order diffracted light jc' by the area 4c; the $+1^{st}$-order diffracted light jd' by the area 4d; the $+1^{st}$-order diffracted light je' by the area 4e; the $+1^{st}$-order diffracted light jf' by the area 4f; the $+1_{st}$-order diffracted light jg' by the area 4g; and the $+1^{st}$-order diffracted light jh' by the area 4h.

When the blue-violet laser beam collected by the objective lens 7 is focused on the information recording surface 60a, there is a large defocus on the information recording surface 60b. Thus, the $0^{th}$-order diffracted light j0' and $+1^{st}$-order diffracted lights ja' to jh' are also largely defocused on the light receiving element 12. Here, the $0^{th}$-order diffracted light j0' and the $+1^{st}$-order diffracted lights ja' to jh' are so diffracted as not to be incident on none of the light receiving sections A to D. This is because, if the $0^{th}$-order diffracted light j0' and the $+1^{st}$-order diffracted lights ja' to jh' are incident on the light receiving sections A to D, the tracking error signal varies according to the degree of incidence, with the result that a stable tracking control cannot be executed.

The areas 4g and 4h are defined in a central part of the polarizing hologram element 4 shown in FIG. 5, and the $+1^{st}$-order diffracted lights jg, jh generated by the areas 4g, 4h are not used for the generation of the tracking error signal. Here, the $+1^{st}$-order diffracted lights jg, jh are diffracted in a direction normal to a diffracting direction of the $+1^{st}$-order diffracted lights ja to jf. Thus, the light receiving sections A to D can be arranged at positions where the $+1^{st}$-order diffracted lights jg', jh' will not be incident.

Next, the functions of the polarizing hologram element 4 and the light receiving element 12 in the case of recording or reproduction on or from the DVD 70 are described in detail with reference to FIG. 8.

A red laser beam, which is a specified linearly polarized beam incident on the polarizing hologram element 4 shown in FIG. 5 (red laser beam on the return path reflected by the DVD 70 in this embodiment), is split into a $0^{th}$-order diffracted light and $\pm 1^{st}$-order diffracted lights. The $0^{th}$-order diffracted light k0 is generated by the areas 4a to 4h; the $+1^{st}$-order diffracted light ka by the area 4a; the $+1^{st}$-order diffracted light kb by the area 4b; the $+1^{st}$-order diffracted light kc by the area 4c; the $+1^{st}$-order diffracted light kd by the area 4d; the $+1^{st}$-order diffracted light ke by the area 4e; the $+1^{st}$-order diffracted light kf by the area 4f; the $+1^{st}$-order diffracted light kg by the area 4g; and the $+1^{st}$-order diffracted light kh by the area 4h.

A focus error signal FE at the time of recording or reproduction on or from the DVD 70 is obtained by a calculation defined by the following equation (4).

$$FE = (IF1 + IF3) - (IF2 + IF4) \qquad (4).$$

Further, a tracking error signal TE can be given by a calculation defined by the following equation (5):

$$TE = (IA + IE) - (IB + IF) \qquad (5)$$

Figure 8:
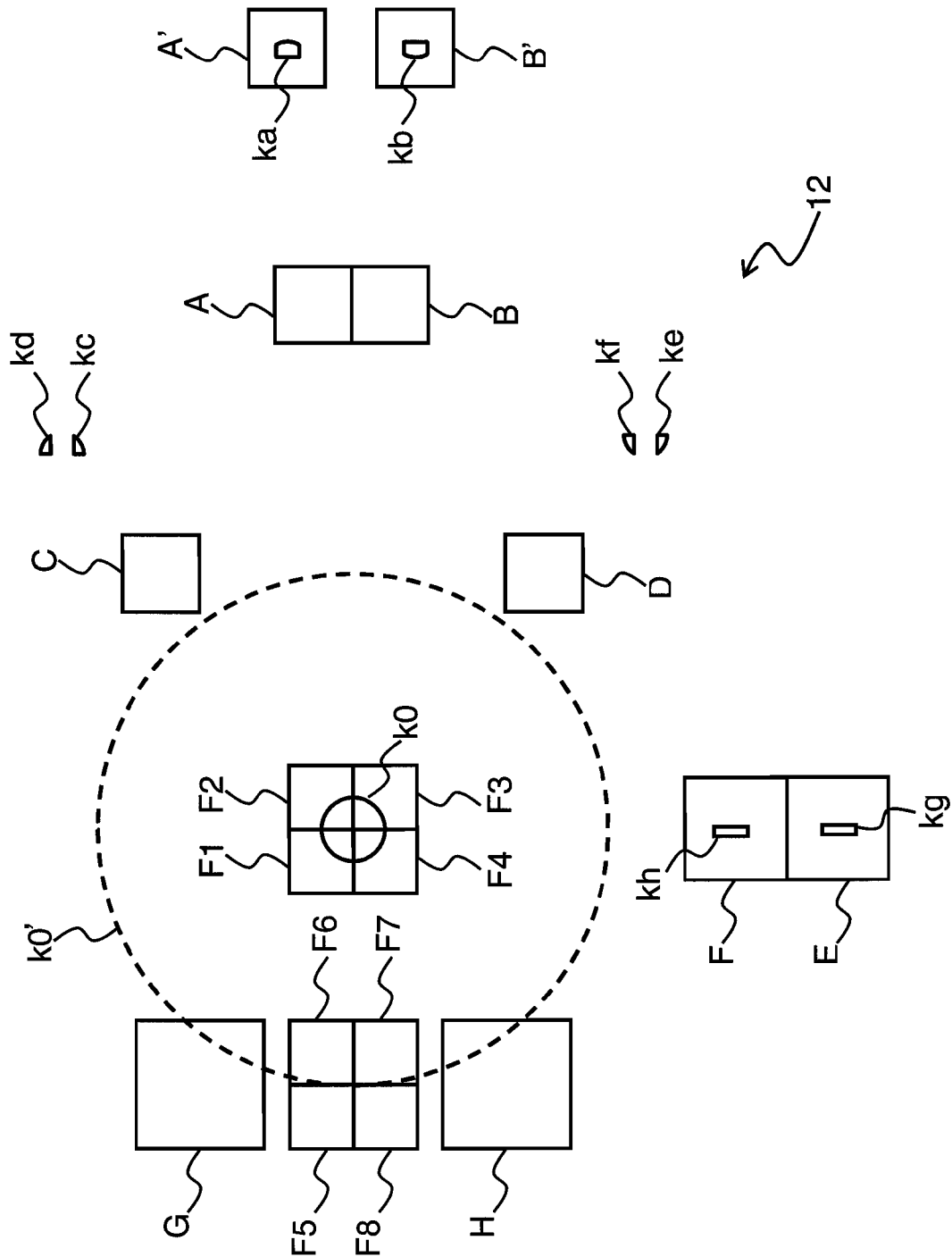
FIG. 8 is a diagram showing a state of a laser beam reflected by a DVD and reaching the light receiving element with respect to the pattern of the light receiving areas of the light receiving element in the first embodiment.

FIG. 8 is a diagram showing a state of a laser beam reflected by the DVD 70 and reaching the light receiving element 12 with respect to the pattern of the light receiving areas of the light receiving element 12 in the first embodiment. The $0^{th}$-order diffracted light k0 is received by the four light receiving sections F1 to F4; the $+1^{st}$-order diffracted light ka by the light receiving section A'; the $+1^{st}$-order diffracted light kb by the light receiving section B'; the $+1^{st}$-order diffracted lights kg by the light receiving section E; and the $+1^{st}$-order diffracted light kh by the light receiving section F. It should be noted that the $+1^{st}$-order diffracted lights kc, kd, ke and kf are received by none of the light receiving sections. This is because the $+1^{st}$-order diffracted lights kc, kd, ke and kf are lights hardly subject to the modulation of the groove of the information track of the DVD 70 and are substantially unnecessary for the detection of the tracking error signal TE by the so-called one-beam push-pull method.

The $0^{th}$-order diffracted light k0 and $+1^{st}$-order diffracted lights ka to kh are diffracted lights generated when the red laser beam reflected by the information recording surface of the DVD 70 is incident on the polarizing hologram element 4. Since the DVD 70 has two information recording surfaces 70a, 70b (not shown), a beam reflected by the information recording surface 70b different from the information recording surface 70a actually used for recording or reproduction is also incident on the polarizing hologram element 4 to generate diffracted lights. A $0^{th}$-order diffracted light k0' and $+1^{st}$-order diffracted lights ka' to kh' (not shown) are diffracted lights generated when the red laser beam reflected by the information recording surface 70b is incident on the polarizing hologram element 4. The $0^{th}$-order diffracted light k0' is generated by the areas 4a to 4h; the $+1^{st}$-order diffracted light ka' by the area 4a; the $+1^{st}$-order diffracted light kb' by the area 4b; the $+1^{st}$-order diffracted light kc' by the area 4c; the $+1^{st}$-order diffracted light kd' by the area 4d; the $+1^{st}$-order diffracted light ke' by the area 4e; the $+1^{st}$-order diffracted light kf' by the area 4f; the $+1^{st}$-order diffracted light kg' by the area 4g; and the $+1^{st}$-order diffracted light kh' by the area 4h.

When the red laser beam collected by the objective lens 7 is focused on the information recording surface 70a, there is a large defocus on the information recording surface 70b. Thus, the $0^{th}$-order diffracted light k0' and $+1^{st}$-order diffracted lights ka' to kh' (not shown) are also largely defocused on the light receiving element 12. Here, it is designed such that the $0^{th}$-order diffracted light k0' is incident on none of the light receiving sections A, B, E and F.

This is because, if the $0^{th}$-order diffracted light k0' is incident on the light receiving sections A, B, E and F, the tracking error signal varies according to the degree of incidence, with the result that a stable tracking control cannot be executed.

As compared to the BD 60 in which a distance between the two information recording surfaces is about 20 µm, a distance between the two information recording surfaces is 40 µm or longer in the DVD 70. Thus, defocus amounts of the $+1^{st}$-order diffracted lights ka' to kh' (not shown) become very large. Accordingly, even if the $+1^{st}$-order diffracted lights ka' to kh' are incident on the light receiving sections A, B, E and F, the influence thereof on the tracking error signal is very small, wherefore there is no substantial problem.

As described above, since the polarizing hologram element 4 and the objective lens 7 are united, the laser beam reflected by the DVD 70 hardly moves on the polarizing hologram element 4 even if the objective lens 7 moves at the time of the tracking control. Accordingly, even if the optical axis of the objective lens 7 is deviated from that of a red laser beam emitted from the two-wavelength light source 11 upon detecting a tracking error signal by the one-beam push-pull method, no offset is generated in the tracking error signal. Accordingly, the one-beam push-pull method can be applied even to an optical system, whose information track pitches are relatively larger than light spots and a reflected light from which has a small diffraction angle, such as a DVD-RAM.

The tracking error signal TE can also be obtained by a calculation defined by the following equation (6) by arranging the light receiving section C' connected with the light receiving section C by wiring and the light receiving section D' connected with the light receiving section D by wiring, and detecting the $+1^{st}$-order diffracted lights kc, kd, ke and kf.

$$TE = (IA + IC + IE) - (IB + ID + IF) \qquad (6).$$

In this case, it is preferable to form dichroic films for transmitting red laser beams, but not transmitting blue-violet laser beams on the light receiving sections C', D', so that the $+1^{st}$-order diffracted lights jd', jf' of the blue-violet laser beams in FIG. 7 are not detected by the light receiving sections C', D'.

Next, the functions of the polarizing hologram element 4 and the light receiving element 12 in the case of recording or reproduction on or from the CD 80 are described in detail with reference to FIG. 9.

An infrared laser beam incident on the diffraction grating shown in FIG. 3 is split into a $0^{th}$-order diffracted light m0, a $+1^{st}$-order diffracted lights m1 and a $-1^{st}$-order diffracted light m2. However, as described above, the $0^{th}$-order diffracted light m0, the $+1^{st}$-order diffracted lights m1 and the $-1^{st}$-order diffracted lights m2 reflected by the information recording surface of the CD 80 are not diffracted by the polarizing hologram element 4.

A focus error signal FE at the time of recording or reproduction on or from the CD 80 is obtained by a calculation defined by the following equation (7).

$$FE = (IF5 + IF7) - (IF6 + IF8) \qquad (7).$$

Further, a tracking error signal TE can be given by a calculation defined by the following equation (8):

$$TE = IG - IH \qquad (8)$$

Since the emission points are displaced from each other by the distance δ as shown in FIG. 4, the red laser beam for recording or reproducing information on or from the DVD 70 and the infrared laser beam for recording or reproducing information on or from the CD 80 are reflected by the respective information recording surfaces, and the optical axes thereof when these beams are incident on the light receiving element 12 are also displaced. Accordingly, the light receiving sections F1 to F4 are used for the detection of the focus error signals of the BD 60 and the DVD 70 and the light receiving sections F5 to F8 are used for the detection of the focus error signal of the CD 80.

Figure 9:
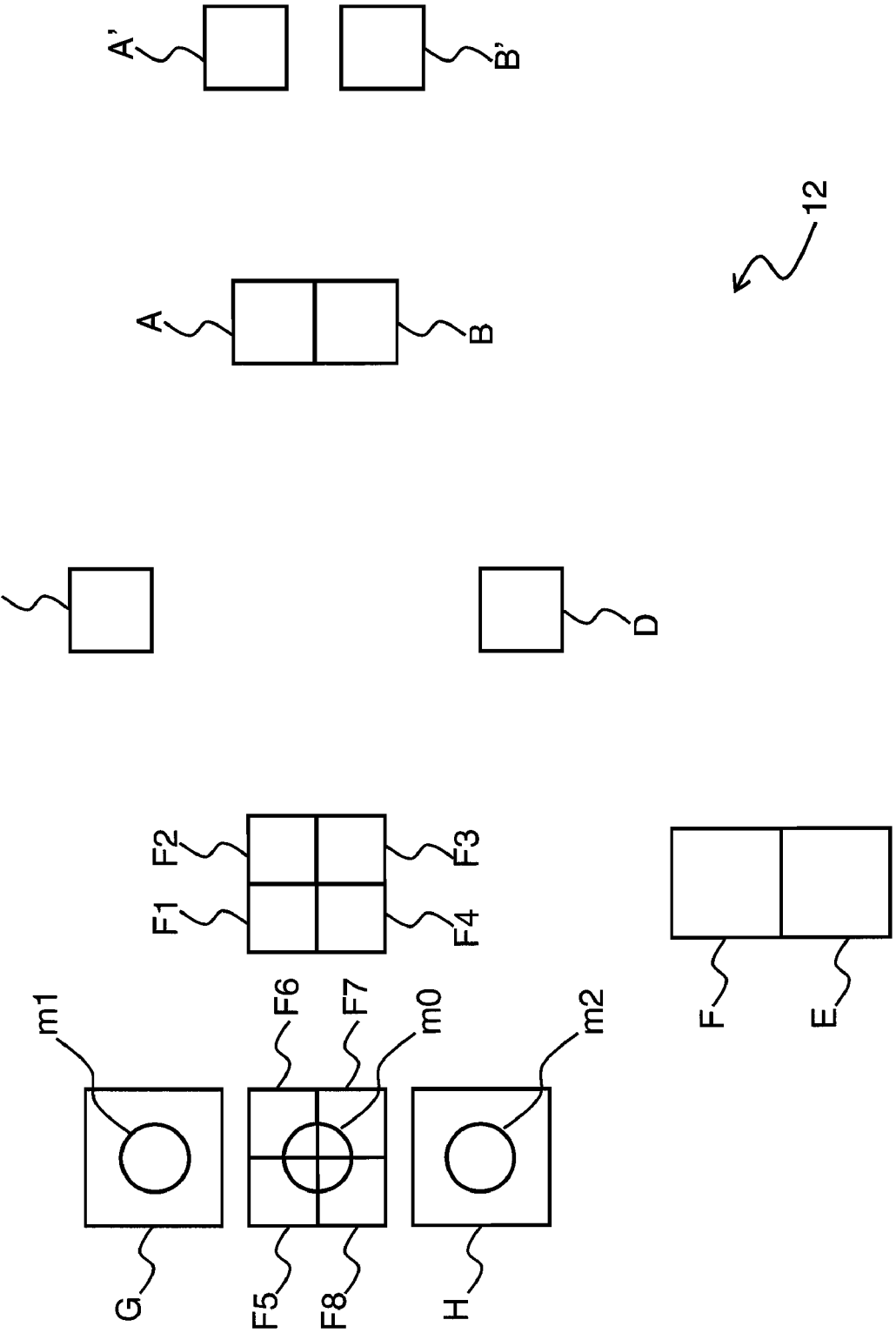
FIG. 9 is a diagram showing a state of a laser beam reflected by a CD and reaching the light receiving element with respect to the pattern of the light receiving areas of the light receiving element in the first embodiment.

FIG. 9 is a diagram showing a state of a laser beam reflected by the CD 80 and reaching the light receiving element 12 with respect to the pattern of the light receiving areas of the light receiving element 12 of the first embodiment. The $0^{th}$-order diffracted light m0 is received by the four light receiving sections F5 to F8; the $+1^{st}$-order diffracted lights m1 by the light receiving section G; and the $-1^{st}$-order diffracted lights m2 by the light receiving section H, and the tracking error signal is obtained by a so-called three-beam method.

Second Embodiment

Next, a second embodiment of the present invention is described with reference to FIGS. 10 to 15.

In the second embodiment, component elements common to the first embodiment are not described below by being identified by the same reference numerals.

In an optical head of the second embodiment, a diffracting direction of a polarizing hologram element 4' and a pattern of light receiving areas of a light receiving element 12' differ from the polarizing hologram element 4 and the light receiving element 12 of the first embodiment, but the other constructions including the beam splitting pattern of the polarizing hologram element 4' are identical.

FIG. 10 is a diagram showing the pattern of the light receiving areas of the light receiving element 12' in the second embodiment of the present invention. The light receiving element 12' includes a total of eighteen light receiving sections F1 to F8, A to H and A', B'. Here, although the light receiving sections A, A' and the light receiving sections B, B' are arranged at different positions, each pair can be assumed to be one light receiving section and has one output since they are connected by wiring.

The light receiving sections F1 to F4 are used for the detection of focus error signals of a BD 60 and a DVD 70 and signals for reproducing information recorded in optical discs. The light receiving sections F5 to F8 are used for the detection of a focus error signal of a CD 80 and signals for reproducing information recorded in optical discs. On the other hand, the light receiving sections A to D are used for the detection of a tracking error signal of the BD 60; the light receiving sections A, B, E and F are used for the detection of a tracking error signal of the DVD 70; and the light receiving sections G, H are used for the detection of a tracking error signal of the CD 80.

The light receiving sections F1 to F8 and A to H respectively output current signals IF1 to IF8 and IA to IH corresponding to amounts of received lights. A focus error signal FE used for the recording or reproduction on or from the BD 60 is given by a calculation defined by the following equation (9):

$$FE=(IF1+IF3)-(IF2+IF4) \tag{9}$$

Further, a tracking error signal TE can be given by a calculation defined by the following equation (10):

$$TE=(IA-IB)-k(IC-ID) \tag{10}$$

where k is a constant.

Figure 11:
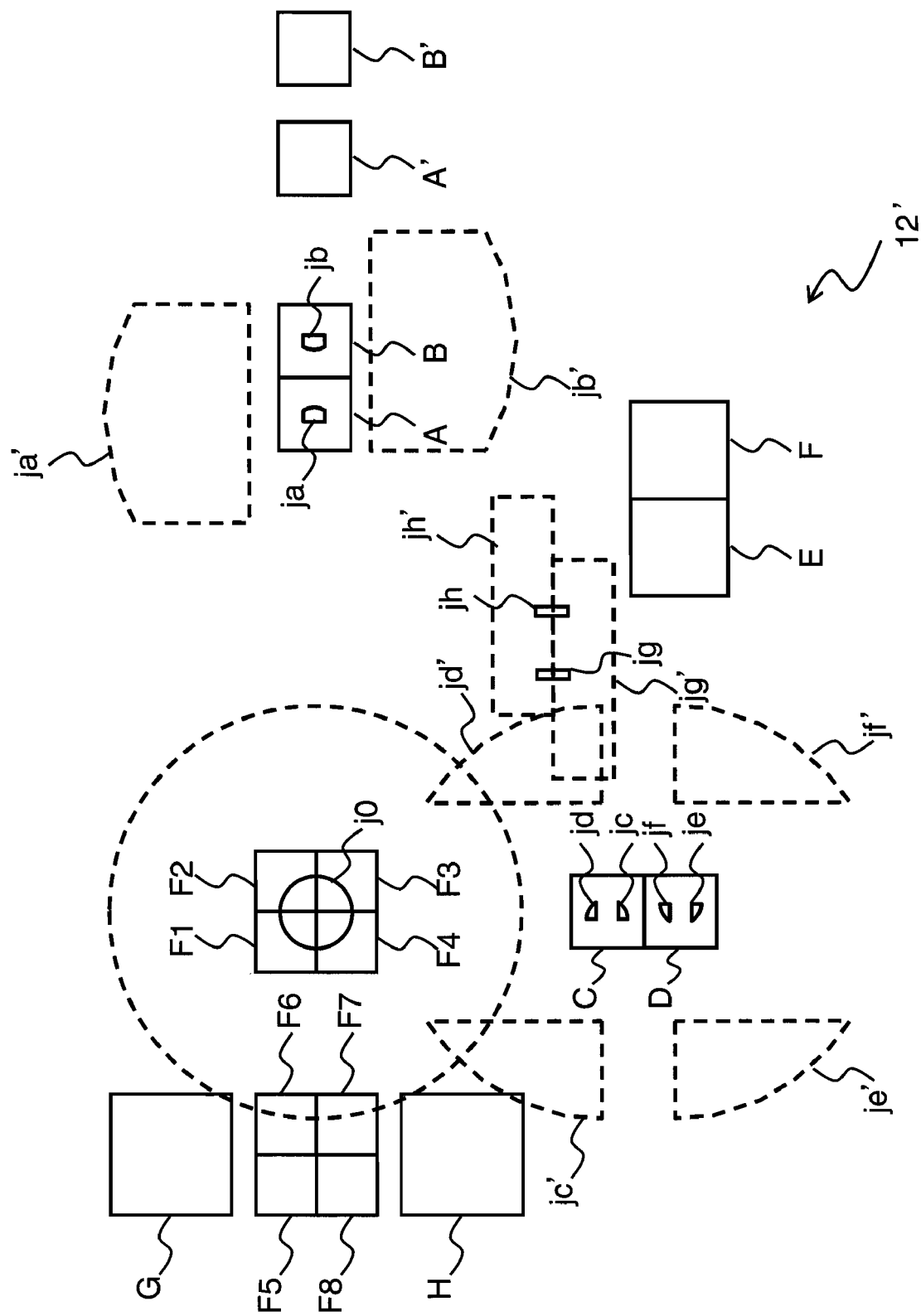
FIG. 11 is a diagram showing a state of a laser beam reflected by a BD and reaching the light receiving element with respect to pattern of light receiving areas of the light receiving element in the second embodiment.

FIG. 11 is a diagram showing a state of a laser beam reflected by the BD 60 and reaching the light receiving element 12' with respect to the pattern of the light receiving areas of the light receiving element 12' in the second embodiment.

A $0^{th}$-order diffracted light j0 is received by the four light receiving sections F1 to F4; a $+1^{st}$-order diffracted light ja by the light receiving section A; a $+1^{st}$-order diffracted light jb by the light receiving section B; $+1^{st}$-order diffracted lights jc, jd by the light receiving section C; and $+1^{st}$-order diffracted lights je, jf by the light receiving section D. It should be noted that the $+1^{st}$-order diffracted lights jg, jh are so diffracted as not to be received by none of the light receiving sections.

The $0^{th}$-order diffracted light j0 and $+1^{st}$-order diffracted lights ja to jh are diffracted lights generated when the blue-violet laser beam reflected by an information recording surface of the BD 60 is incident on the polarizing hologram element 4'. Since the BD 60 has two information recording surfaces 60a, 60b (not shown), a beam reflected by the information recording surface 60b different from the information recording surface 60a actually used for recording or reproduction is also incident on the polarizing hologram element 4' to generate diffracted lights. A $0^{th}$-order diffracted light j0' and $+1^{st}$-order diffracted lights ja' to jh' are diffracted lights generated when the blue-violet laser beam reflected by the information recording surface 60b is incident on the polarizing hologram element 4'. The $0^{th}$-order diffracted light j0' is generated by the areas 4a to 4h; the $+1^{st}$-order diffracted light ja' by the area 4a; the $+1^{st}$-order diffracted light jb' by the area 4b; the $+1^{st}$-order diffracted light jc' by the area 4c; the $+1^{st}$-order diffracted light jd' by the area 4d; the $+1^{st}$-order diffracted light je' by the area 4e; the $+1^{st}$-order diffracted light jf' by the area 4f; the $+1^{st}$-order diffracted light jg' by the area 4g; and the $+1^{st}$-order diffracted light jh' by the area 4h.

When the blue-violet laser beam collected by the objective lens 7 is focused on the information recording surface 60a, there is a large defocus on the information recording surface 60b. Thus, the $0^{th}$-order diffracted light j0' and $+1^{st}$-order diffracted lights ja' to jh' are also largely defocused on the light receiving element 12'. Here, the $0^{th}$-order diffracted light j0' and the $+1^{st}$-order diffracted lights ja' to jh' are so diffracted as to be incident on none of the light receiving sections A to D. This is because, if the $0^{th}$-order diffracted light j0' and the $+1^{st}$-order diffracted lights ja' to jh' are incident on the light receiving sections A to D, the tracking error signal varies according to the degree of incidence, with the result that a stable tracking control cannot be executed.

Next, the functions of the polarizing hologram element 4' and the light receiving element 12' in the case of recording or reproduction on or from the DVD 70 are described in detail with reference to FIG. 12.

A focus error signal FE at the time of recording or reproduction on or from the DVD 70 is obtained by a calculation defined by the following equation (11):

$$FE=(IF1+IF3)-(IF2+IF4) \tag{11}$$

Further, a tracking error signal TE can be given by a calculation defined by the following equation (12):

$$TE=(IA+IE)-(IB+IF) \tag{12}$$

Figure 12:
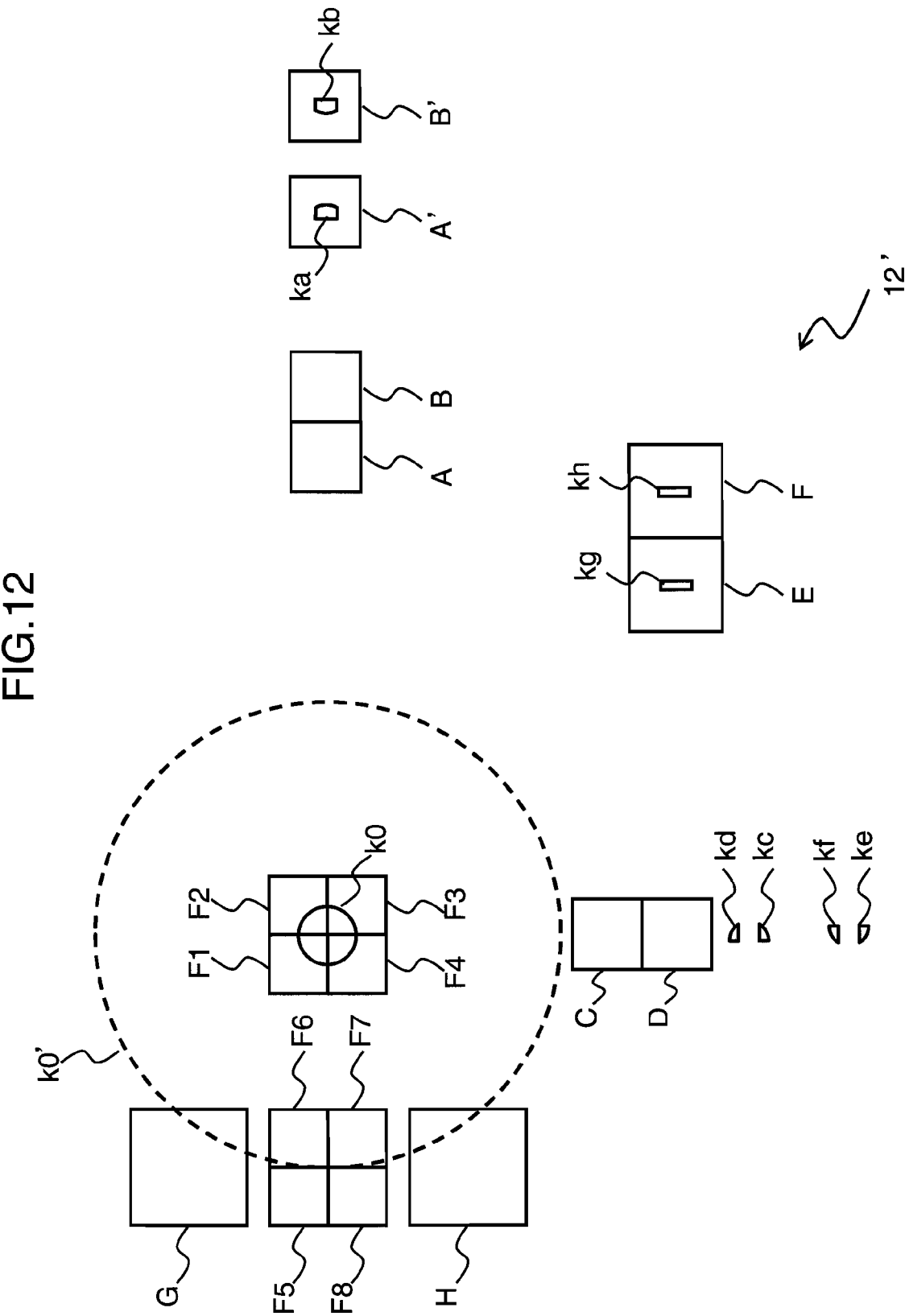
FIG. 12 is a diagram showing a state of a laser beam reflected by a DVD and reaching the light receiving element with respect to the pattern of the light receiving areas of the light receiving element in the second embodiment.

FIG. 12 is a diagram showing a state of a laser beam reflected by the DVD 70 and reaching the light receiving element 12' with respect to the pattern of the light receiving areas of the light receiving element 12' in the second embodiment. A $0^{th}$-order diffracted light k0 is received by the four light receiving sections F1 to F4; a $+1^{st}$-order diffracted light ka by the light receiving section A'; a $+1^{st}$-order diffracted light kb by the light receiving section B'; a $+1^{st}$-order diffracted lights kg by the light receiving section E; and a $+1^{st}$-order diffracted light kh by the light receiving section F. It should be noted that the $+1^{st}$-order diffracted lights kc, kd, ke and kf are received by none of the light receiving sections.

This is because the +1$^{st}$-order diffracted lights kc, kd, ke and kf are lights hardly subject to the modulation of the groove of the information track of the DVD 70 and are substantially unnecessary for the detection of the tracking error signal TE by the so-called one-beam push-pull method.

Figure 13:
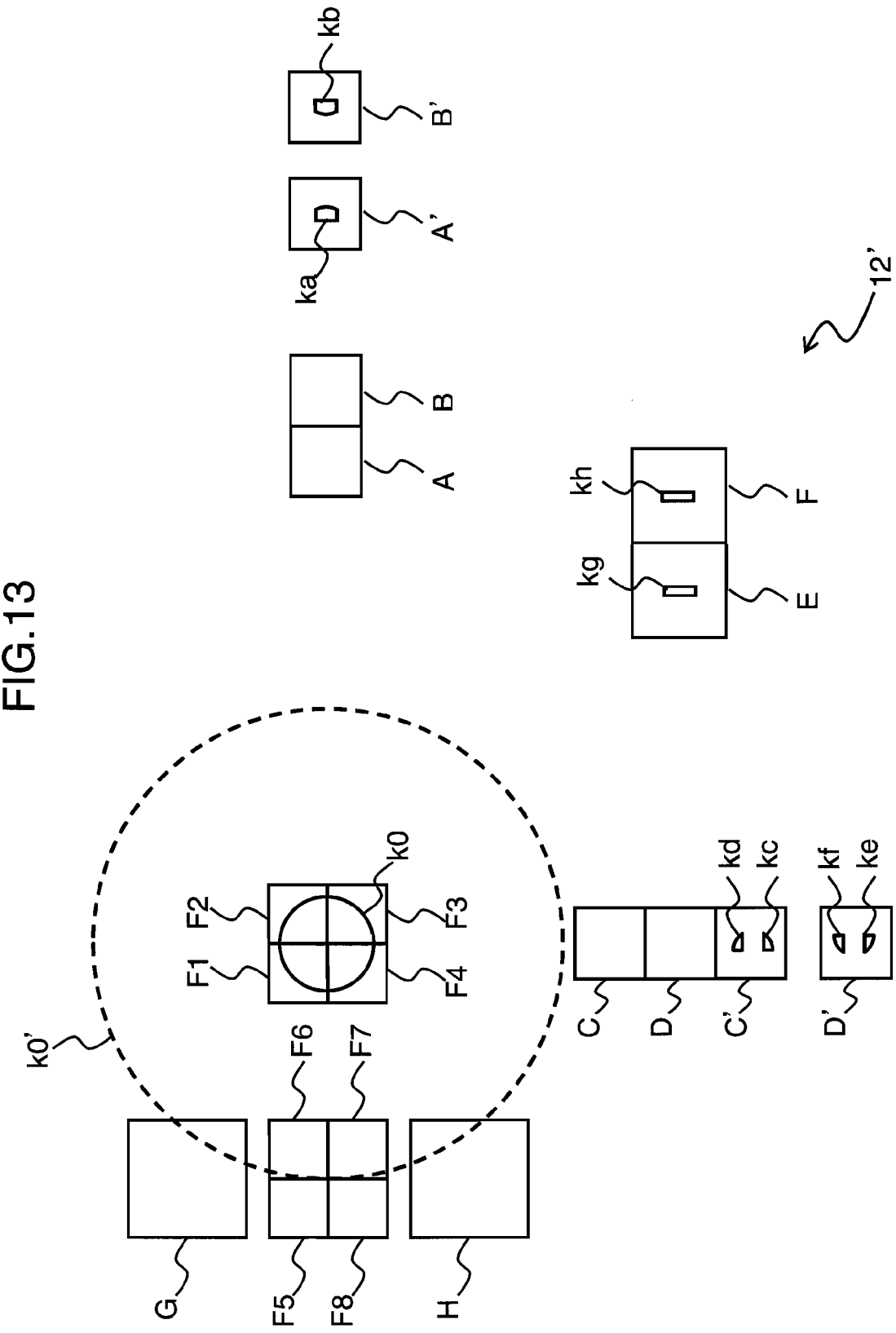
FIG. 13 is a diagram showing a state of a laser beam reflected by a DVD and reaching another light receiving element of the second embodiment with respect to a pattern of light receiving areas of this light receiving element.

However, the tracking error signal TE can also be obtained by a calculation defined by the following equation (13) by arranging the light receiving section C' connected with the light receiving section C by wiring and the light receiving section D' connected with the light receiving section D by wiring as shown in FIG. 13, and detecting the +1$^{st}$-order diffracted lights kc, kd, ke and kf.

$$TE=(IA+IC+IE)-(IB+ID+IF) \qquad (13).$$

The 0$^{th}$-order diffracted light k0 and +1$^{st}$-order diffracted lights ka to kh are diffracted lights generated when the red laser beam reflected by the information recording surface of the DVD 70 is incident on the polarizing hologram element 4'. Since the DVD 70 has two information recording surfaces 70a, 70b (not shown), a beam reflected by the information recording surface 70b different from the information recording surface 70a actually used for recording or reproduction is also incident on the polarizing hologram element 4' to generate diffracted lights. A 0$^{th}$-order diffracted light k0' and +1$^{st}$-order diffracted lights ka' to kh' (not shown) are diffracted lights generated when the red laser beam reflected by the information recording surface 70b is incident on the polarizing hologram element 4'. The 0$^{th}$-order diffracted light k0' is generated by the areas 4a to 4h; the +1$^{st}$-order diffracted light ka' by the area 4a; the +1$^{st}$-order diffracted light kb' by the area 4b; the +1$^{st}$-order diffracted light kc' by the area 4c; the +1$^{st}$-order diffracted light kd' by the area 4d; the +1$^{st}$-order diffracted light ke' by the area 4e; the +1$^{st}$-order diffracted light kf' by the area 4f; the +1$^{st}$-order diffracted light kg' by the area 4g; and the +1$^{st}$-order diffracted light kh' by the area 4h.

When the red laser beam collected by the objective lens 7 is focused on the information recording surface 70a, there is a large defocus on the information recording surface 70b. Thus, the 0$^{th}$-order diffracted light k0' and +1$^{st}$-order diffracted lights ka' to kh' (not shown) are also largely defocused on the light receiving element 12'. Here, the 0$^{th}$-order diffracted light k0' is so diffracted as to be incident on none of the light receiving sections A to F.

This is because, if the 0$^{th}$-order diffracted light k0' is incident on the light receiving sections A to F, the tracking error signal varies according to the degree of incidence, with the result that a stable tracking control cannot be executed.

As compared to the BD 60 in which a distance between the two information recording surfaces is about 20 µm, a distance between the two information recording surfaces is 40 µm or longer in the DVD 70. Thus, defocus amounts of the +1$^{st}$-order diffracted lights ka' to kh' (not shown) become very large. Accordingly, even if the +1$^{st}$-order diffracted lights ka' to kh' are incident on the light receiving sections A to F, the influence thereof on the tracking error signal is very small, wherefore there is no substantial problem.

Next, the functions of the polarizing hologram element 4' and the light receiving element 12' in the case of recording or reproduction on or from the CD 80 are described in detail with reference to FIG. 14.

An infrared laser beam incident on the diffraction grating shown in FIG. 3 is split into a 0$^{th}$-order diffracted light m0, a +1$^{st}$-order diffracted lights m1 and a –1$^{st}$-order diffracted light m2. However, the 0$^{th}$-order diffracted light m0, the +1$^{st}$-order diffracted lights m1 and the –1$^{st}$-order diffracted lights m2 reflected by the information recording surface of the CD 80 are not diffracted by the polarizing hologram element 4'.

A focus error signal FE at the time of recording or reproduction on or from the CD 80 is obtained by a calculation defined by the following equation (14).

$$FE=(IF5+IF7)-(IF6+IF8) \qquad (14).$$

Further, a tracking error signal TE can be given by a calculation defined by the following equation (15):

$$TE=IG-IH \qquad (15)$$

FIG. 14 is a diagram showing a state of a laser beam reflected by the CD 80 and reaching the light receiving element 12' with respect to the pattern of the light receiving areas of the light receiving element 12' of the second embodiment. The 0$^{th}$-order diffracted light m0 is received by the four light receiving sections F5 to F8; the +1$^{st}$-order diffracted lights m1 by the light receiving section G; and the –1$^{st}$-order diffracted lights m2 by the light receiving section H, and the tracking error signal is obtained by a so-called three-beam method.

Figure 15:
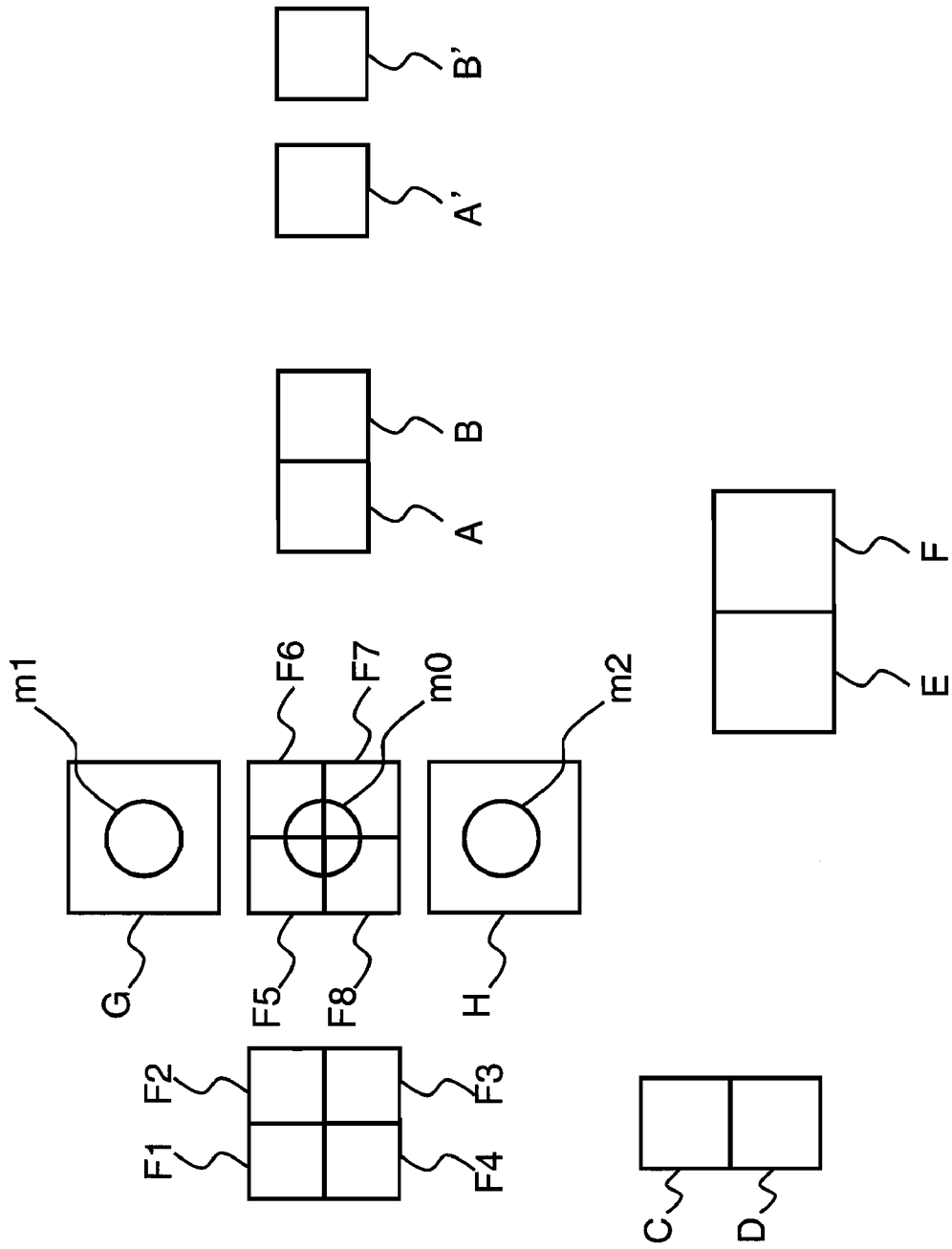
FIG. 15 is a diagram showing a state of a laser beam reflected by a CD and reaching another light receiving element of the second embodiment with respect to a pattern of light receiving areas of this light receiving element.

Even if the light receiving sections F5 to F8, G and H are arranged as shown in FIG. 15, the tracking error signal can be similarly obtained by the three-beam method. Since the entire arrangement area of the light receiving sections can be reduced by adopting the arrangement as shown in FIG. 15, there is a merit of providing a smaller light receiving element.

Although the specific patterns of the light receiving areas of the light receiving elements 12, 12' are shown in the first and second embodiments as above, the present invention is not limited to these light receiving areas.

Figure 16:
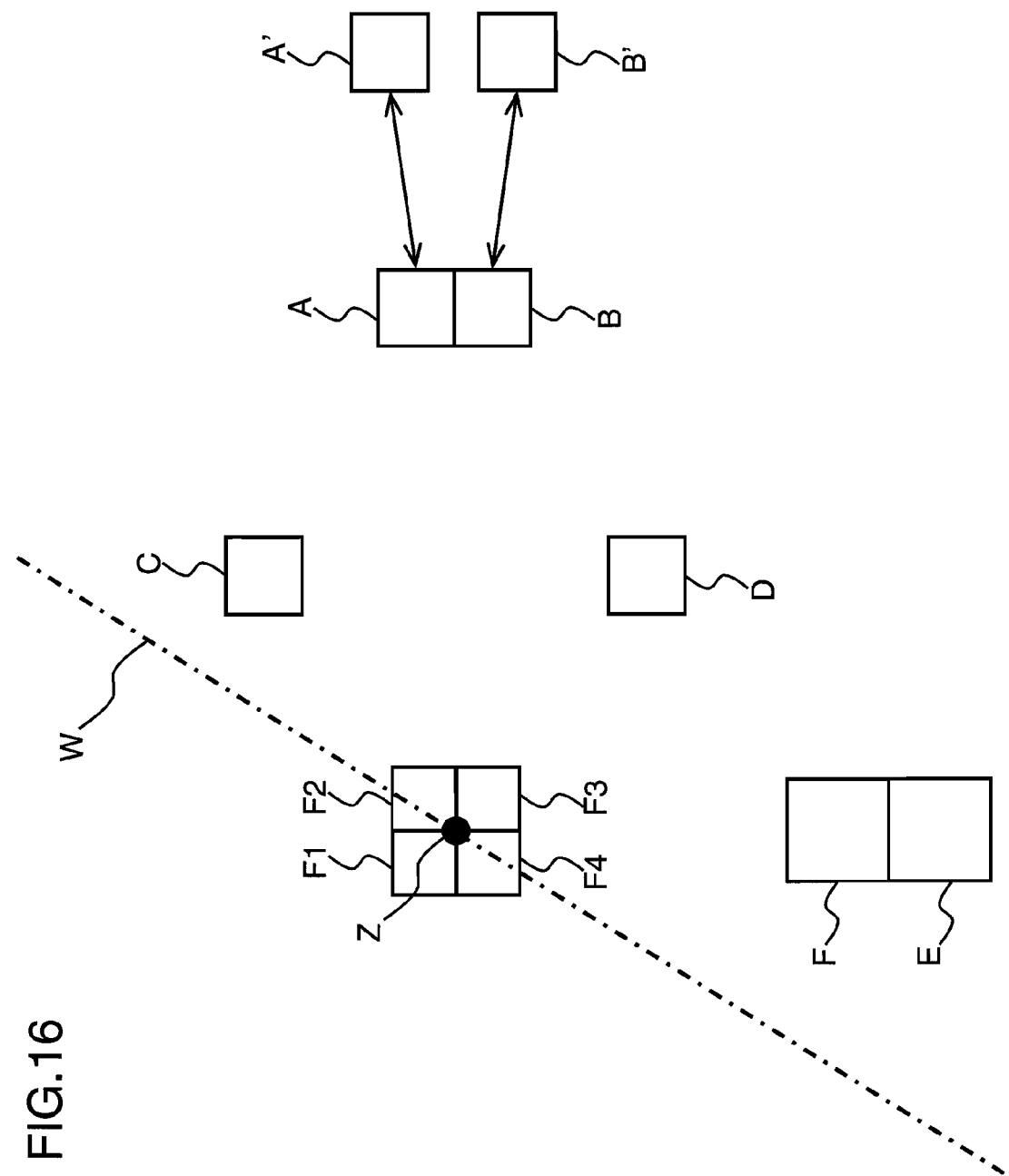
FIG. 16 is a diagram showing the arrangement of light receiving sections of a light receiving element according to a modification of the first and second embodiments.

For example, the light receiving sections A to F for receiving the reflected lights from the BD 60 and DVD 70 are arranged at one side of a straight line W passing through an optical axis Z of the BD 60 and the DVD 70 in FIG. 16. If the cross-sectional shape of the polarizing hologram element is substantially rectangular, not only the above-mentioned +1$^{st}$-order diffracted lights by the polarizing hologram elements 4 and 4', but also –1$^{st}$-order diffracted lights by the polarizing hologram elements 4 and 4' having a conjugate relationship with the +1$^{st}$-order diffracted lights are incident at positions symmetrical with respect to the optical axis Z. Since both the –1$^{st}$-order diffracted lights of a laser beam reflected by the information recording surface 60a used for actual recording or reproduction in the BD 60 and incident on the light receiving element and the –1$^{st}$-order diffracted lights of a laser beam reflected by the information recording surface 60b different from the information recording surface 60a and incident on the light receiving element, for example, become stray lights, it is necessary to prevent these lights from being incident on any of the light receiving sections.

By arranging the light receiving sections A to F only at one side of the straight line W passing through the optical axis Z of the BD 60 and the DVD 70 as shown in FIG. 16, the stray lights caused by –1$^{st}$-order diffracted lights can be completely avoided.

By forming the polarizing hologram elements 4, 4' to have so-called blaze-shapes, the generation of –1$^{st}$-order diffracted lights can be suppressed. In this case, the light receiving sections need not be arranged only at one side of the straight line W passing through the optical axis Z of the BD 60 and the DVD 70 as described above, and may be so arranged as to avoid the stray lights caused by the +1$^{st}$-order diffracted lights.

Figure 25:
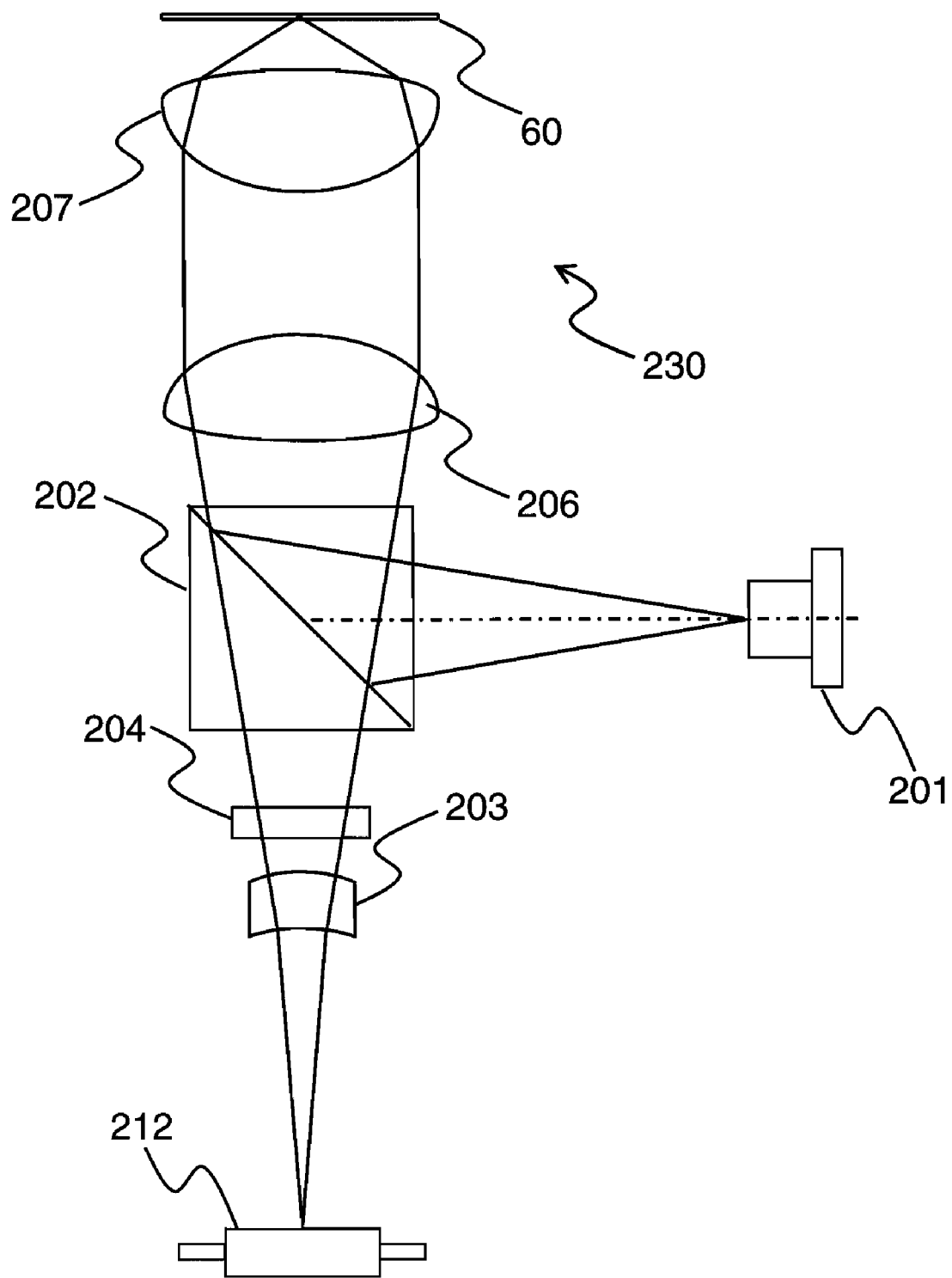
FIG. 25 is a schematic construction diagram of another conventional optical head in the case of recording or reproduction on or from a BD.
Figure 26:
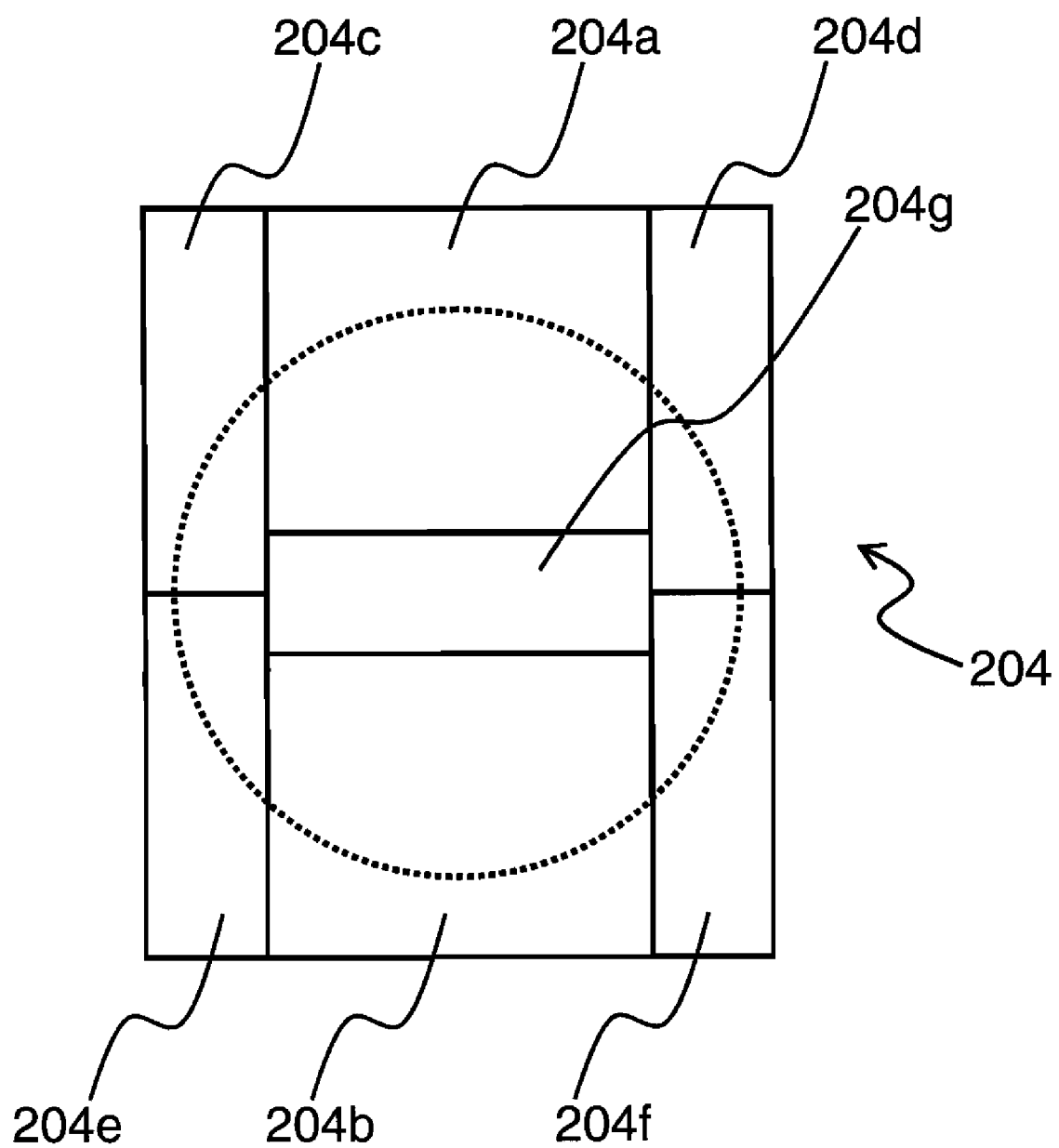
FIG. 26 is a diagram showing a beam splitting pattern of a hologram element of the another conventional head.
Figure 27:
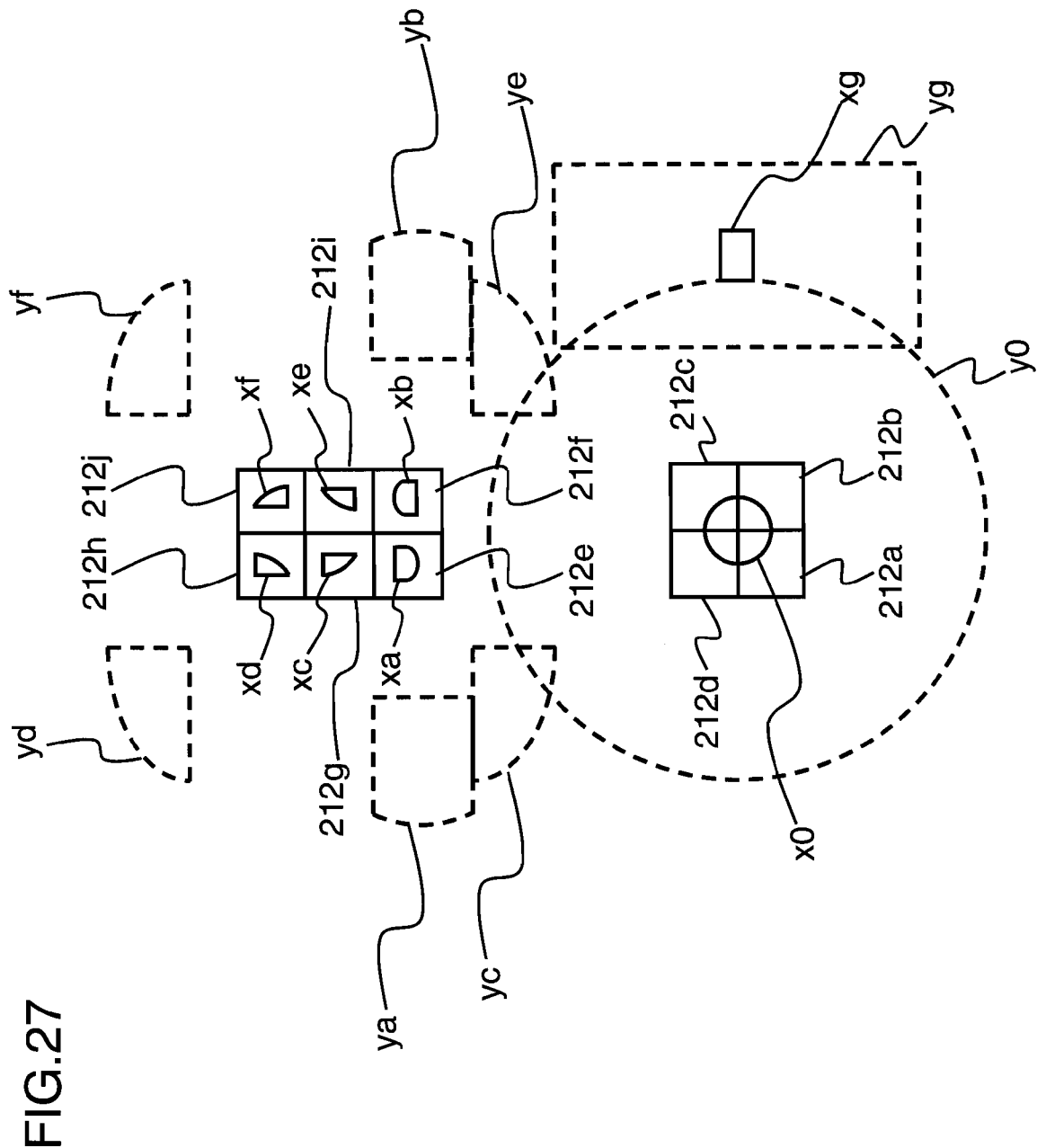
FIG. 27 is a diagram showing a state of a laser beam reflected by a BD and reaching a light receiving element with respect to a pattern of light receiving areas of the light receiving element of the another conventional optical head.
Figure 28:
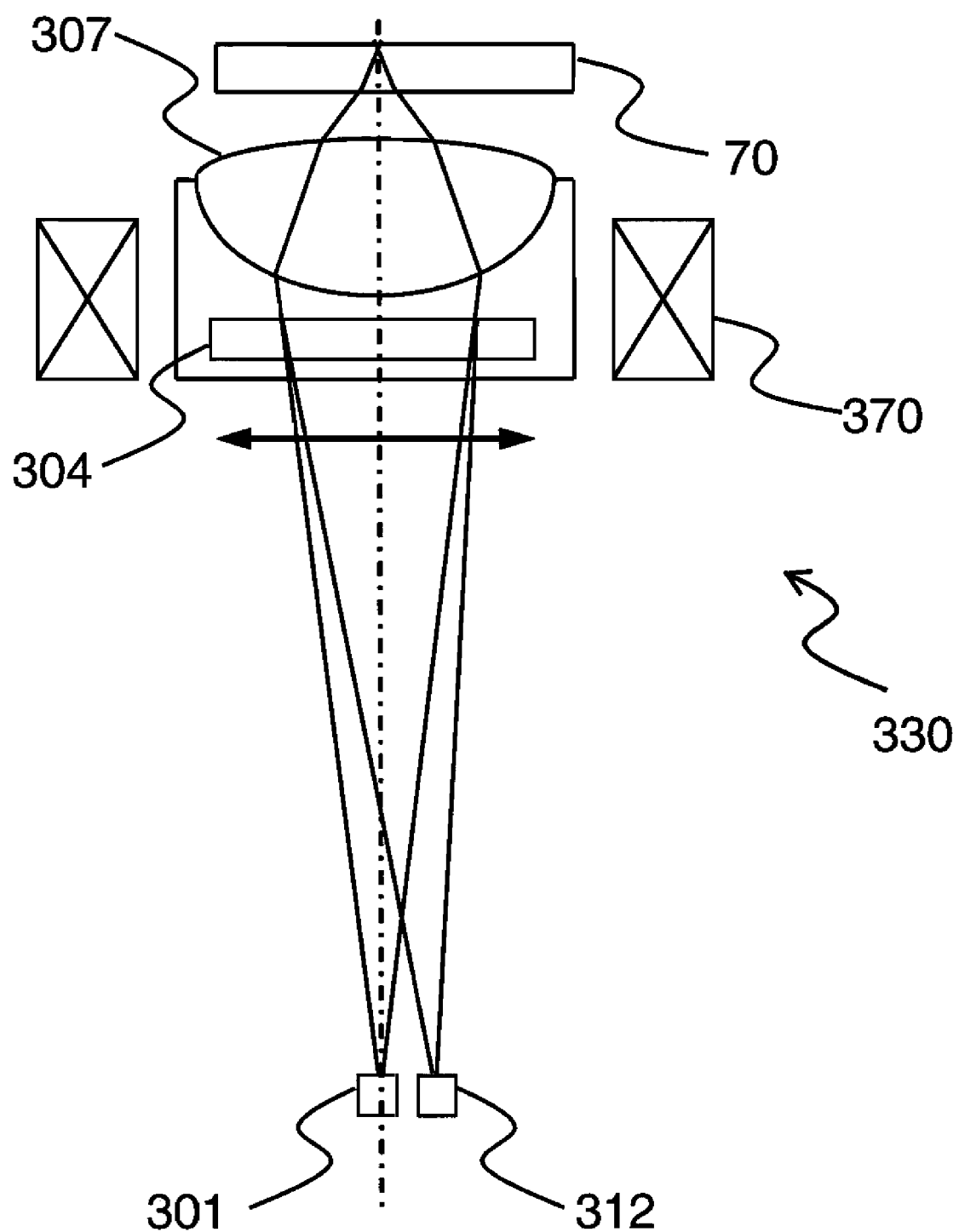
FIG. 28 is a schematic construction diagram of still another optical head in the case of recording or reproduction on or from a DVD.

Instead of driving the polarizing hologram elements 4, 4' together with the objective lens 7, the polarizing hologram elements 4, 4' may be arranged before the light receiving element as in the prior art shown in FIG. 25.

Figure 17:
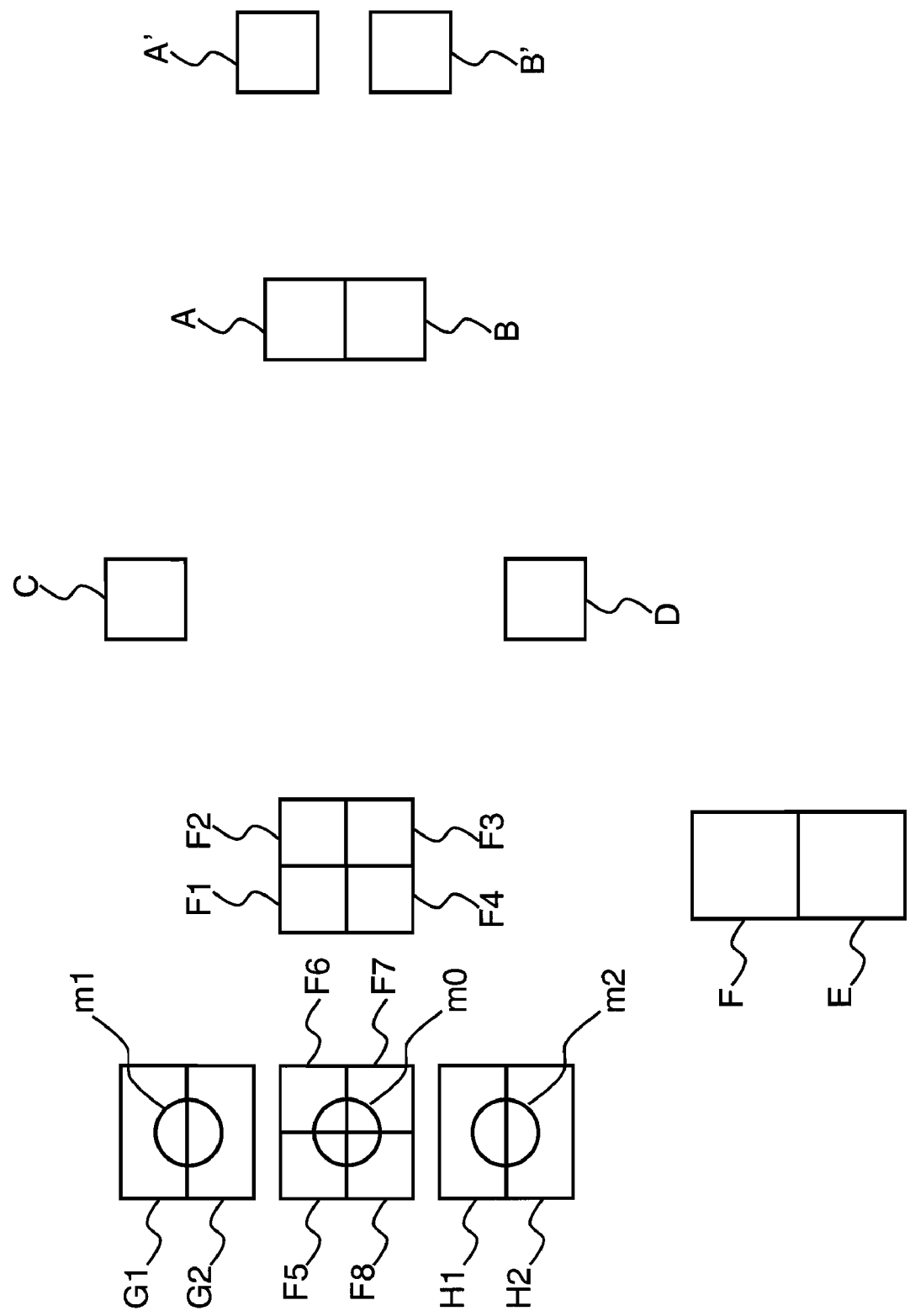
FIG. 17 is a diagram showing a state of a laser beam reflected by a CD and reaching a light receiving element according to another modification of the first and second embodiments with respect to the pattern of light receiving areas of this light receiving element.

Further, although the three-beam method is described as an example of the method for detecting the tracking error signal of the CD 80 in the first and second embodiments, the method for detecting the tracking error signal of the CD 80 is not limited to the three-beam method and, for example, a DPP method (differential push-pull method) is also applicable. For example, in the case of obtaining a tracking error signal by the DPP method, the light receiving sections G, H of the first embodiment are respectively divided into light receiving sections G1, G2 and light receiving sections H1, H2 as shown in FIG. 17. If the light receiving sections G1, G2, H1 and H2 respectively output current signals IG1, IG2, IH1 and IH2 corresponding to amounts of received lights, the tracking error signal TE can be obtained by a calculation defined by the following equation (16).

$$TE=\{(IF5+IF6)-(IF7+IF8)\}k\{(IG1-IG2)+(IH1-IH2)\} \quad (16)$$

where k is a constant.

As described above, if the DPP method is used as the method for detecting the tracking error signal of the CD 80, the more accurate detection of tracking error signals can be realized particularly for recording type CDs.

Although the focus error signals are detected by the astigmatism method using the light receiving sections F1 to F4 and the light receiving sections F5 to F8 in the above embodiments, these light receiving sections F1 to F4, F5 to F8 can also be used for the detection of tracking error signals by a differential phase detection method (DPD method). By being made applicable to the differential phase detection method in this way, reproduction from ROM discs (BD-ROMs, DVD-ROMs and CD-ROMs) in conformity with the respective wavelengths becomes possible.

Although the blue-violet laser beam having a wavelength of 405 nm is emitted from the light source 1 and the red laser beam having a wavelength of 655 nm and the infrared laser beam having a wavelength of 785 nm are emitted from the two-wavelength light source 11 as another light emitting and receiving element in the first and second embodiments, the present invention is not limited thereto. For example, a light source for emitting a red laser beam and another light source for emitting an infrared laser beam may be arranged at different positions, and the optical axes of these laser beams may be aligned with each other using, for example, a beam splitter.

Figure 18:
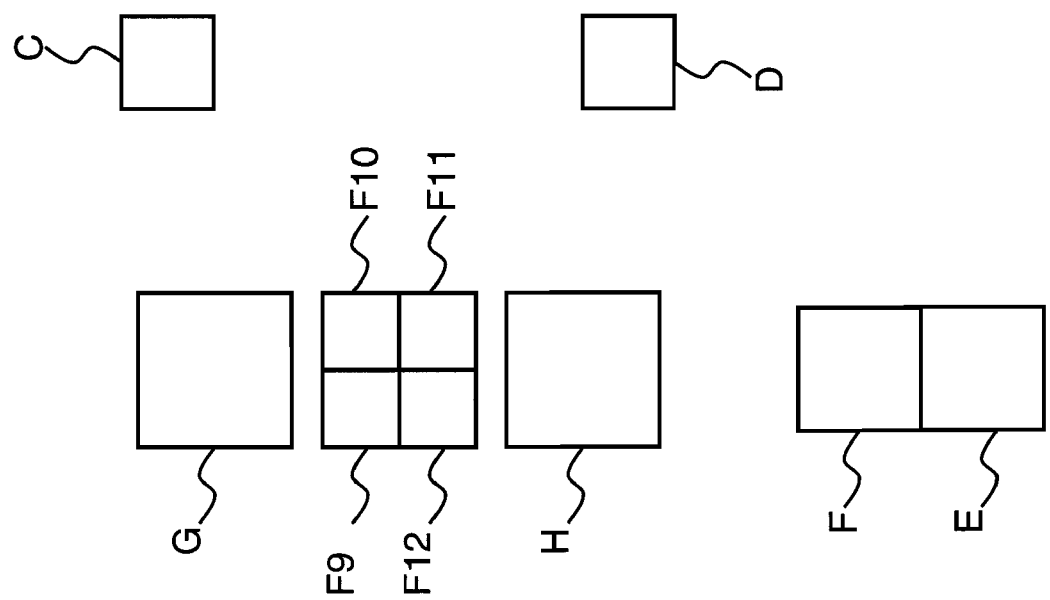
FIG. 18 is a diagram showing a pattern of light receiving areas of a light receiving element according to still another modification of the first and second embodiments.

In such a case, unlike the first and second embodiments, the optical axis of the infrared laser beam can be aligned with those of the blue-violet laser beam and the red laser beam, wherefore the focus error signals of the BD 60, the DVD 70 and the CD 80 can be obtained by the astigmatism method and the tracking error signals thereof can be obtained by the differential phase detection method using light receiving sections F9 to F12 instead of using the light receiving sections F1 to F4, F5 to F8, for example, as shown in FIG. 18. As a result, the number of the light receiving sections used can be reduced by four, which has a merit of being able to simplify the circuit construction.

Further, by using a single-wavelength light source for emitting only a red laser beam having a wavelength of 655 nm instead of the two-wavelength light source 11, the present invention can also be applied to optical heads capable of recording or reproduction on or from only the BD 60 and DVD 70. In this case, the light receiving sections G, H of FIG. 18 are unnecessary.

The collimator lens 6 in the first and second embodiments may be movable in an optical axis direction so as to make a beam incident on the objective lens 7 into a slightly convergent or divergent beam rather than a parallel beam. This can optimize spherical aberrations and increase an working distance when beams are focused on the information recording surfaces of the BD 60, the DVD 70 and the CD 80. Such a collimator lens is not described in detail since it is not substantially related to the contents of the present invention. However, it is apparent that the present invention is also applicable to an optical head provided with such a collimator lens.

Although the light receiving elements 12, 12' are arranged at positions different from the light source 1 in the first and second embodiment, the light source 1 and the light receiving elements 12, 12' may be formed by a light emitting and receiving element arranged at the same position.

Further, although all of the blue-violet laser beam, the red laser beam and the infrared laser beam diffracted by the polarizing hologram elements 4, 4' are received by the light receiving elements 12, 12' in the first and second embodiments, the red laser beam and the infrared laser beam may be received by a different light receiving element. In such a case, the light receiving element for receiving the red laser beam and the infrared laser beam may be a light emitting and receiving element integral to the two wavelength light source. In this case as well, the tracking error signals can be suitably detected for the BD 60, the DVD 70 and the CD 80, thus still within the application range of the present invention.

Furthermore, although the laser beam having a wavelength of 405 nm is used in the case of recording or reproducing on or from the BD 60, the laser beam having a wavelength of 655 nm is used in the case of recording or reproducing on or from the DVD 70, and the laser beam having a wavelength of 785 nm is used in the case of recording or reproducing on or from the CD 80 in the first and second embodiments, the present invention is not limited thereto. It is apparent that the present invention is widely applicable to optical heads capable of recording or reproducing information on or from three types of optical discs using three laser beams having different wavelengths, i.e. a laser beam having a wavelength of 350 to 450 nm, a laser beam having a wavelength of 600 to 700 nm and a laser beam having a wavelength of 750 to 850 nm.

As described above, the optical heads of the above embodiments respectively have good optical performances for light sources for emitting three laser beams of different wavelengths, i.e. a blue-violet laser beam, a red laser beam and an infrared laser beam and for recording or reproduction on or from the corresponding optical discs, and are capable of satisfactorily recording or reproducing information on or from a plurality of optical discs such as BDs, DVDs and CDs.

Third Embodiment

Figure 19:
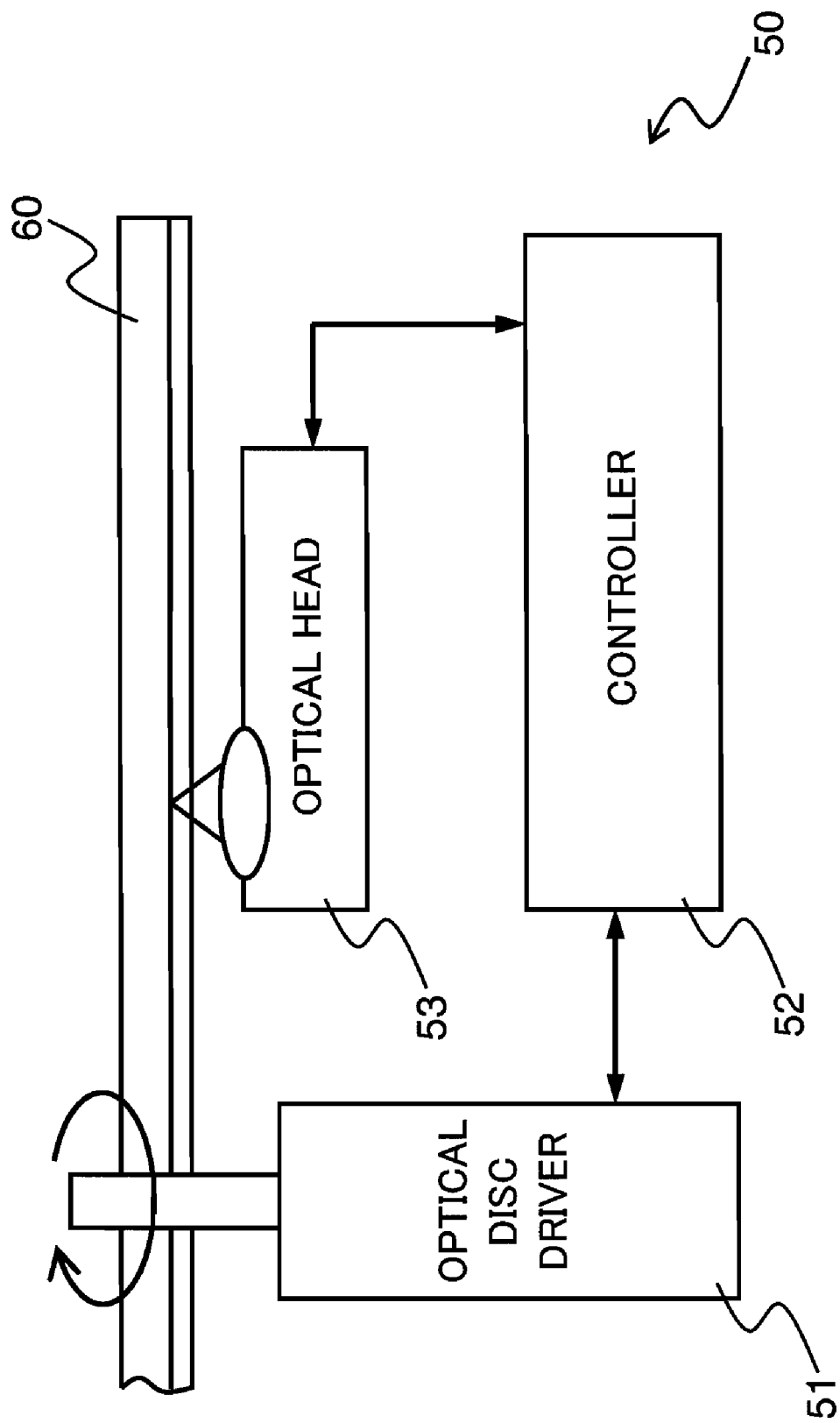
FIG. 19 is a schematic construction diagram of an optical disc device according to a third embodiment of the invention.

FIG. 19 is a schematic construction diagram of an optical disc device according to a third embodiment of the present invention.

In FIG. 19, an optical disc device 50 is internally provided with an optical disc driver 51, a controller 52 and an optical head 53, and is compatible with a BD 60, a DVD 70 and a CD 80.

The optical disc driver 51 drives and rotates the BD 60, DVD 70 or CD 80, and the optical head 53 is an optical head according to the first or second embodiment. The controller 52 drives and controls the optical disc driver 51 and the optical head 53, processes a control signal and an information signal received by the optical head 53, and interfaces the inside and outside of the optical disc device 50.

Since including the optical head according to the first or second embodiment, the optical disc device 50 of this embodiment can satisfactorily record or reproduce information on or from optical discs corresponding to a plurality of light sources.

Fourth Embodiment

Figure 20:
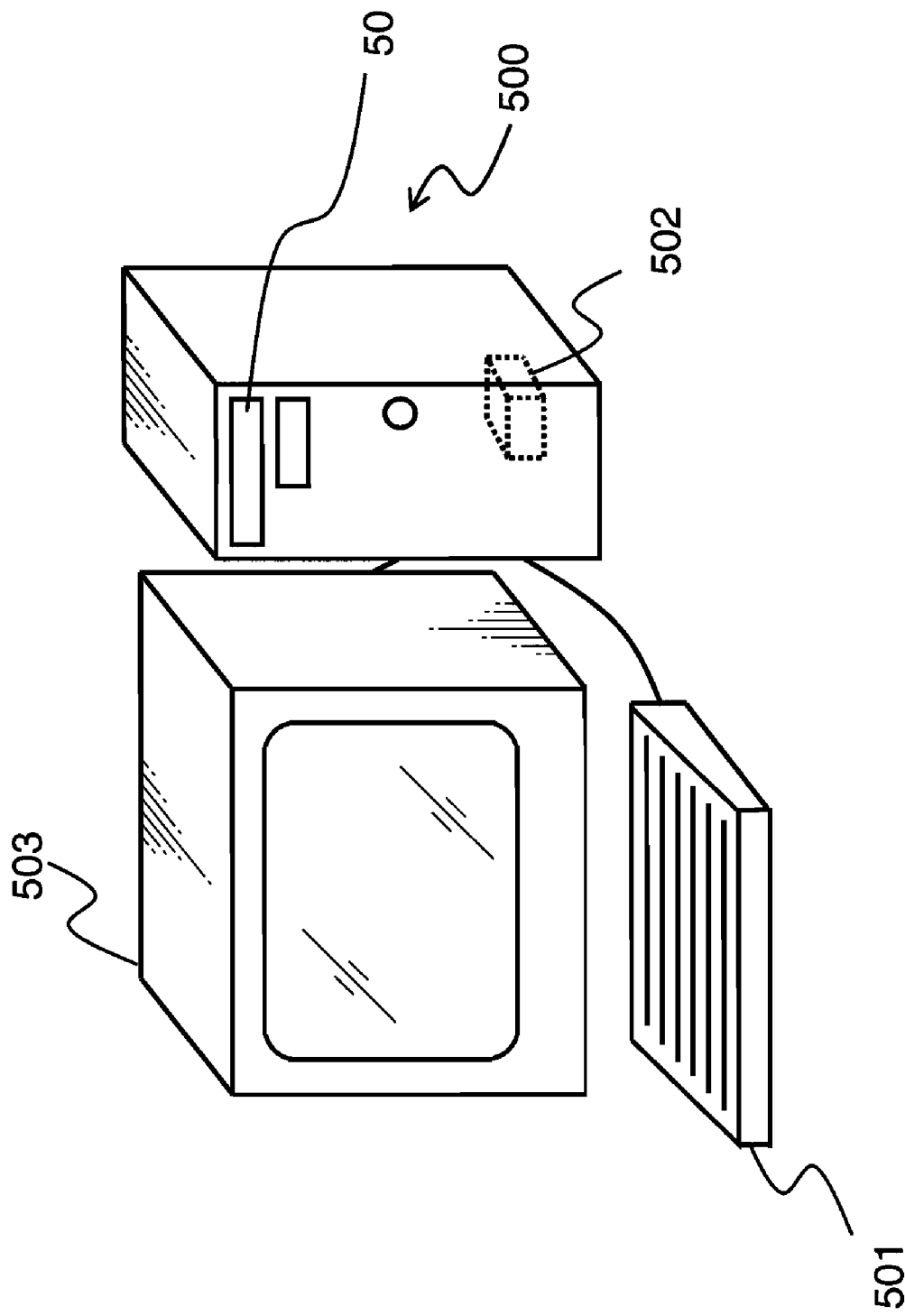
FIG. 20 is a schematic construction diagram of a computer according to a fourth embodiment of the invention.

FIG. 20 is a schematic construction diagram of a computer according to a fourth embodiment of the present invention.

In FIG. 20, a computer 500 is provided with the optical disc device 50 of the third embodiment, an input device 501 such as a keyboard, a mouse or a touch panel used to enter information, an arithmetic unit 502 such as a central processing unit (CPU) for performing calculation based on information entered by the input device 501 and information read from the optical disc device 50, and an output device 503 such as a cathode-ray tube, a liquid crystal display device or a printer for displaying information such as the calculation result of the arithmetic unit 502.

Since including the optical disc device 50 of the third embodiment, the computer 500 can satisfactorily record or reproduce information on or from different types of optical discs, therefore having an effect of being widely applicable.

Fifth Embodiment

Figure 21:
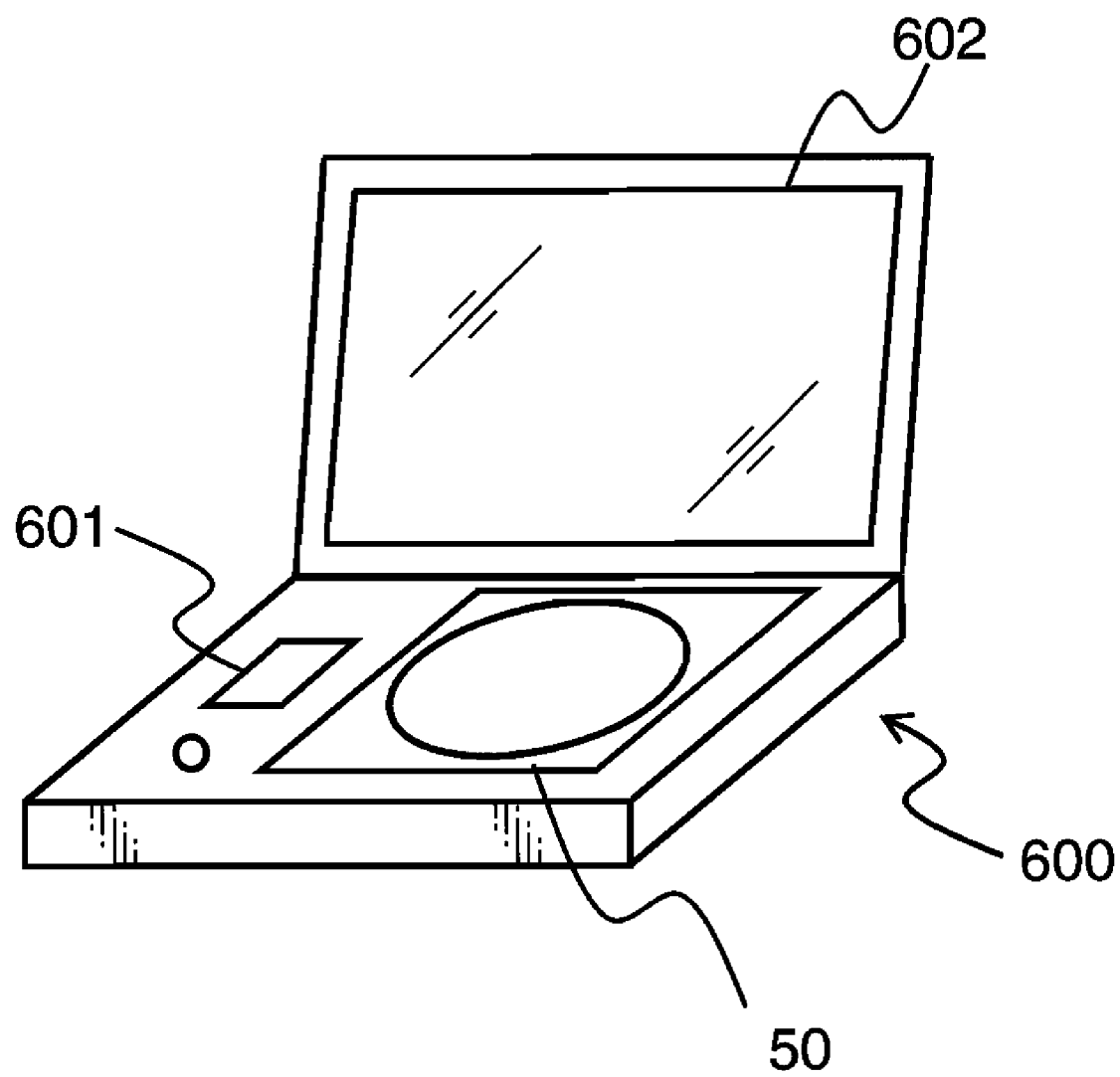
FIG. 21 is a schematic construction diagram of an optical disc player according to a fifth embodiment of the invention.

FIG. 21 is a schematic construction diagram of an optical disc player according to a fifth embodiment of the present invention.

In FIG. 21, an optical disc player 600 is provided with the optical disc device 50 of the third embodiment, and a decoder 601 for converting an information signal obtained from the optical disc device 50 into an image signal.

It should be noted that the optical disc player 600 can also be used as a car navigation system or the like by additionally providing a position sensor such as a GPS and a central processing unit (CPU). A display device 602 such as a liquid crystal monitor may also be added.

Since including the optical disc device 50 of the third embodiment, the optical disc player 600 can satisfactorily record or reproduce information on or from different types of optical discs, therefore having an effect of being widely applicable.

Sixth Embodiment

Figure 22:
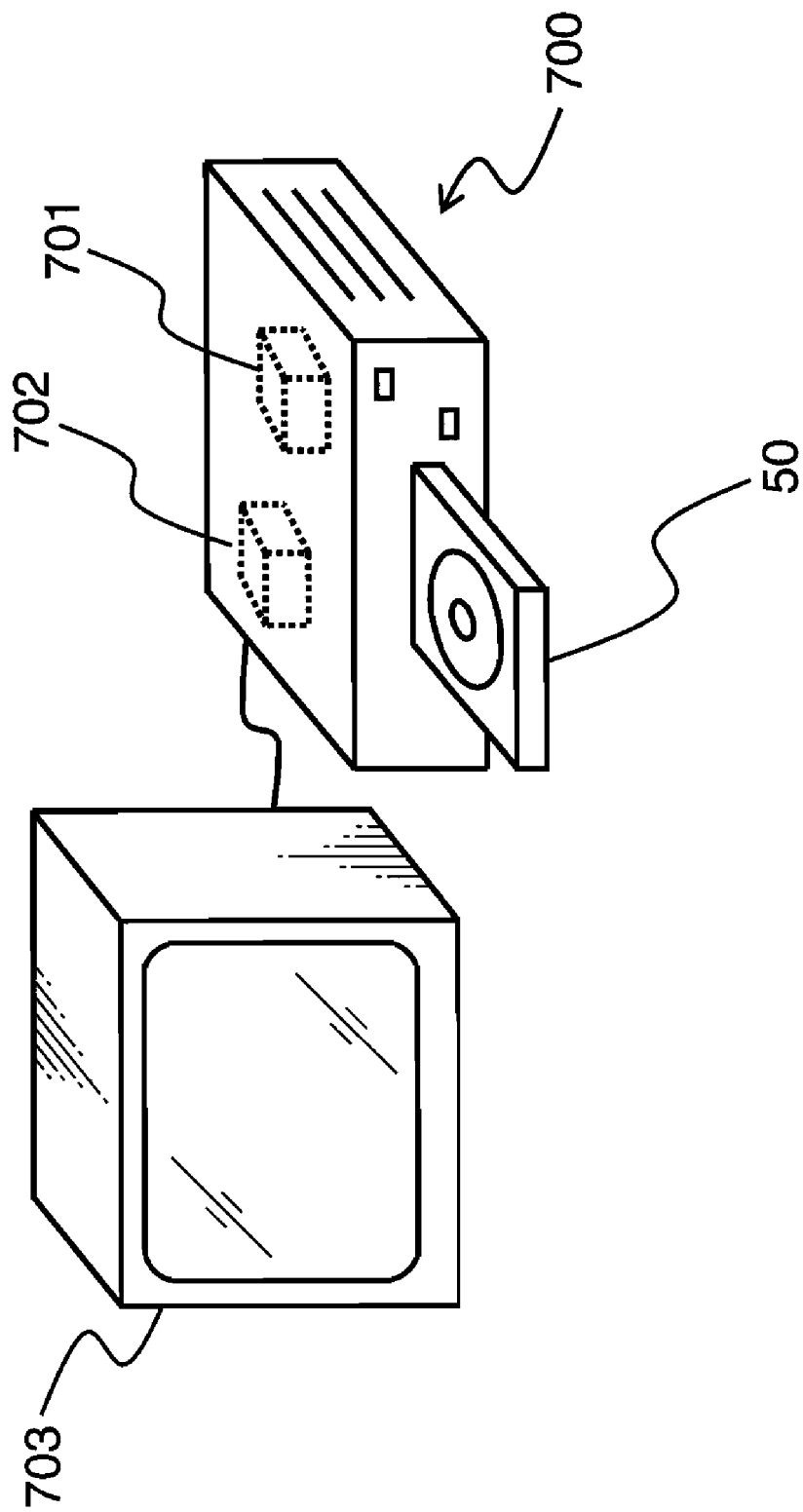
FIG. 22 is a schematic construction diagram of an optical disc recorder according to a sixth embodiment of the invention.
Figure 23:
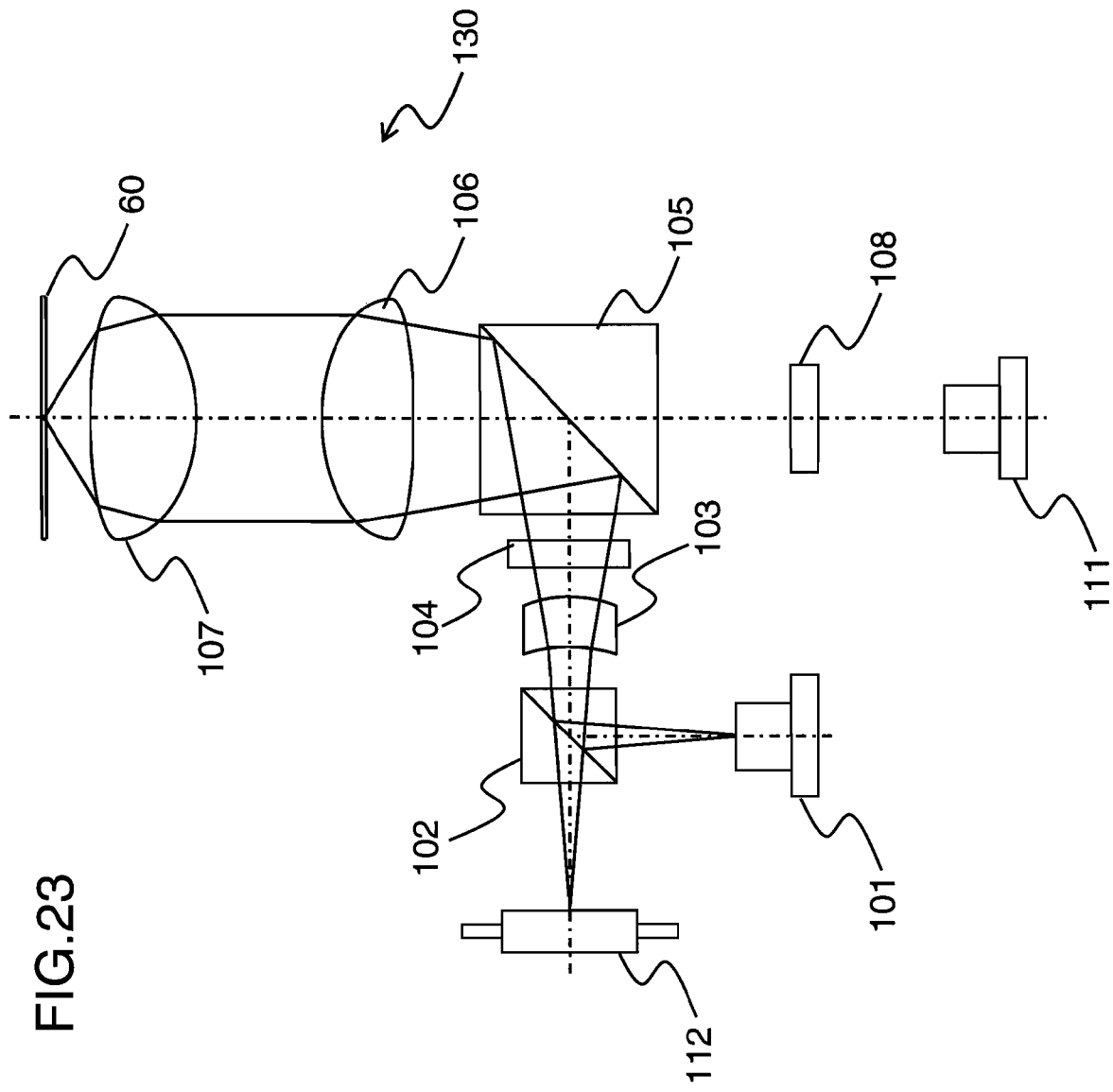
FIG. 23 is a schematic construction diagram of a conventional optical head in the case of recording or reproduction on or from a BD.
Figure 24:
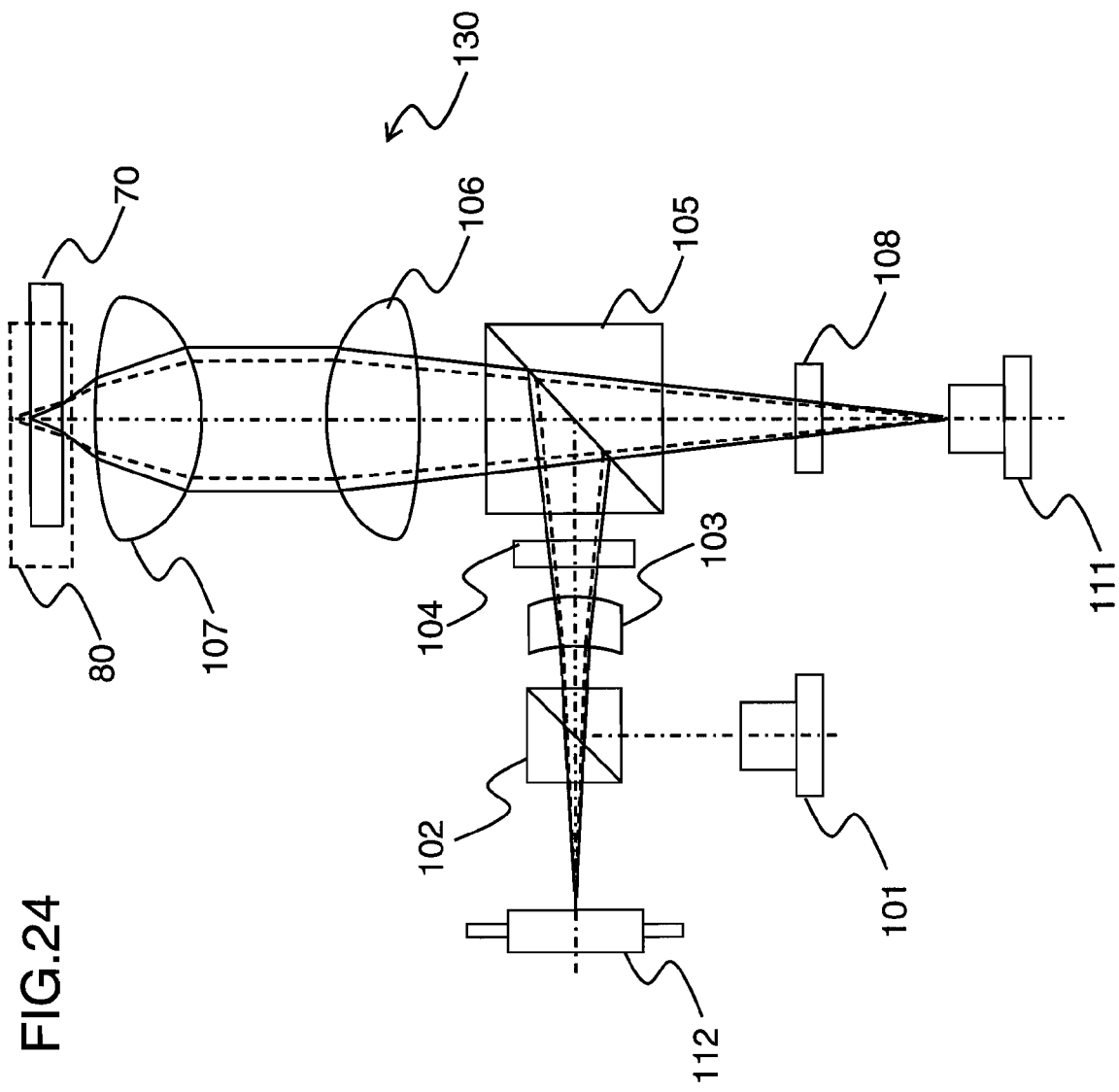
FIG. 24 is a schematic construction diagram of the conventional optical head in the case of recording or reproduction on or from a DVD or CD.

FIG. 22 is a schematic construction diagram of an optical disc recorder according to a sixth embodiment of the present invention.

In FIG. 22, an optical disc recorder 700 is provided with the optical disc device 50 of the third embodiment and an encoder 701 for converting image information into an information signal to be recorded on an optical disc by the optical disc device 50. Preferably, the optical disc recorder 700 also includes a decoder 702 for converting an information signal obtained from the optical disc device 50 into image information, whereby it becomes also possible to reproduce a recorded image. It should be noted that an output device 703 such as a cathode-ray tube or a liquid crystal display device for displaying information or a printer for printing information may also be provided.

Since including the optical disc device 50 of the third embodiment, the optical disc recorder 700 can satisfactorily record or reproduce information on or from different types of optical discs, therefore having an effect of being widely applicable.

The specified embodiments described above mainly embrace inventions having the following constructions.

An optical head according to one aspect of the present invention comprises a first light source for emitting a first laser beam having a first wavelength between 350 nm and 450 nm; a second light source for emitting a second laser beam having a first wavelength between 600 nm and 700 nm; an objective lens for focusing the first laser beam on a first information recording medium and focusing the second laser beam on a second information recording medium different from the first information recording medium; a beam splitting portion arranged on an optical path common to the first laser beam reflected and diffracted by the first information recording medium and the second laser beam reflected and diffracted by the second information recording medium for splitting the respective laser beams into a plurality of beams; and a light receiving portion for receiving the plurality of beams divided by the beam splitting portion, wherein the beam splitting portion includes a first area and a second area divided by a first line passing through the optical axis of the objective lens and parallel to an information track of the first information recording medium in an area where the beam reflected and diffracted by the first information recording medium passes; the first area includes a first transmission area for transmitting many $1^{st}$-order diffracted lights from the first information recording medium, a second transmission area adjacent to the first transmission area and closer to the optical axis than the first transmission area and a third transmission area adjacent to the first and second transmission areas; and the second area includes a fourth transmission area for transmitting many $1^{st}$-order diffracted lights from the first information recording medium, a fifth transmission area adjacent to the fourth transmission area and closer to the optical axis than the fourth transmission area and a sixth transmission area adjacent to the fourth and fifth transmission areas.

According to this construction, the first laser beam having the first wavelength between 350 nm and 450 nm is emitted from the first light source, and the second laser beam having the second wavelength between the 600 nm and 700 nm is emitted from the second light source. By the objective lens, the first laser beam is focused on the first information recording medium and the second laser beam is focused on the second information recording medium different from the first information recording medium. The respective laser beams are split into a plurality of beams by the beam splitting portion arranged on the optical path common to the first laser beam reflected and diffracted by the first information recording medium and the second laser beam reflected and diffracted by the second information recording medium. The plurality of beams split by the beam splitting portion are received by the light receiving portion. The beam splitting portion includes the first and second areas divided by the first line passing through the optical axis of the objective lens and parallel to the information track of the first information recording medium in the area where the beam reflected and diffracted by the first information recording medium passes. The first area includes the first transmission area for transmitting more $1^{st}$-order diffracted lights from the first information recording medium than the other areas of the first area, the second transmission area adjacent to the first transmission area and closer to the optical axis than the first transmission area and the third transmission area adjacent to the first and second transmission areas. The second area includes the fourth transmission area for transmitting more $1^{st}$-order diffracted lights from the first information recording medium than the other areas of the second area, the fifth transmission area adjacent to the fourth transmission area and closer to the optical axis than the fourth transmission area and the sixth transmission area adjacent to the fourth and fifth transmission areas.

Accordingly, a tracking error signal for tracking the first information recording medium is detected based on the first laser beam having passed the first, third, fourth and sixth transmission areas, and a tracking error signal for tracking the second information recording medium is detected based on the second laser beam having passed the first, second, fourth and fifth transmission areas. Therefore, tracking error signals can be suitably detected for different types of optical discs.

In the above optical head, it is preferable that the beam splitting portion is divided into the first to sixth transmission areas by the first line, second and third lines intersecting with the first line, a fourth line intersecting with the second and third lines in the first area, and a fifth line intersecting with the second and third lines in the second area; that the first transmission area is formed at the inner sides of the second and third lines and at the outer side of the fourth line; that the second transmission area is formed at the inner sides of the second, third and fourth lines; that the third transmission area is formed at the outer sides of the second and third lines; that the fourth transmission area is formed at the inner sides of the second and third lines and at the outer side of the fifth line; that the fifth transmission area is formed at the inner sides of the second, third and fifth lines; and that the sixth transmission area is formed at the outer sides of the second and third lines.

According to this construction, the beam splitting portion is divided into the first to sixth transmission areas by the first line, second and third lines intersecting with the first line, the fourth line intersecting with the second and third lines in the first area, and the fifth line intersecting with the second and third lines in the second area. The first transmission area is formed at the inner sides of the second and third lines and at the outer side of the fourth line; the second transmission area is formed at the inner sides of the second, third and fourth lines; the third transmission area is formed at the outer sides of the second and third lines; the fourth transmission area is formed at the inner sides of the second and third lines and at the outer side of the fifth line; the fifth transmission area is formed at the inner sides of the second, third and fifth lines; and the sixth transmission area is formed at the outer sides of the second and third lines.

Accordingly, the beam splitting portion can be divided into the first to sixth transmission areas by the first to fifth lines, and the tracking error signal can be detected based on the laser beam having passed the divided first to sixth transmission areas.

In the above optical head, it is preferable that the second and third lines are straight lines symmetrically located with respect to the optical axis of the objective lens and perpendicularly intersecting with the first line; and that the fourth and fifth lines are symmetrically shaped with respect to the optical axis of the objective lens.

According to this construction, the second and third lines are the straight lines symmetrically located with respect to the optical axis of the objective lens and perpendicularly intersecting with the first line. Further, the fourth and fifth lines are symmetrically shaped with respect to the optical axis of the objective lens. Thus, the first to third transmission areas in the first area and the fourth to sixth transmission areas in the second area are symmetrically shaped with respect to the optical axis of the objective lens, wherefore the tracking error signal can be highly accurately detected.

In the above optical head, the light receiving portion preferably includes at least one or more common light receiving areas for receiving both first and second laser beams and receiving both the first laser beam and the second laser beam split by the beam splitting portion.

According to this construction, the light receiving portion can be miniaturized by receiving both the first laser beam and the second laser beam split by the beam splitting portion by the at least one ore more common light receiving areas.

In the above optical head, the beam splitting portion is driven together with the objective lens. According to this construction, even if the objective lens moves at the time of a tracking control, the laser beam reflected by the second information recording medium hardly moves on the beam splitting portion since the beam splitting portion and the objective lens are united. Thus, a one-beam push-pull method can also be applied to an optical system, whose information track pitches are relatively larger than light spots and a reflected light from which has a small diffraction angle, such as a DVD-RAM.

In the above optical head, the beam splitting portion is preferably a diffractive element for transmitting parts of the first and second laser beams passing therethrough while diffracting the other parts. According to this construction, the transmitted and diffracted first and second laser beams can be introduced to the light receiving portion for the detection of the tracking error signals since the beam splitting portion transmits parts of the first and second laser beams passing therethrough while diffracting the other parts.

In the above optical head, the diffractive element preferably includes a polarizing hologram element for substantially entirely transmitting the first and second laser beams respectively emitted from the first and second light sources and transmitting parts of the first and second laser beams reflected and diffracted by the first and second information recording media while diffracting the other parts.

According to this construction, the polarizing hologram element substantially entirely transmits the first and second laser beams respectively emitted from the first and second light sources. The polarizing hologram element also transmits parts of the first and second laser beams reflected and diffracted by the first and second information recording media while diffracting the other parts.

Since the first and second laser beams on their outward paths are substantially entirely transmitted and the first and second laser beams on their return paths are partly transmitted and partly diffracted, the first and second laser beams reflected and diffracted by the first and second information recording media can be introduced to the light receiving portion for the detection of the tracking error signals.

In the above optical head, the diffractive element preferably has a blaze-shaped cross section. According to this construction, the generation of $-1^{st}$-order diffracted lights can be suppressed by forming the diffractive element to have a blaze-shaped cross section.

In the above optical head, the light receiving portion preferably obtains a first tracking error signal TEa used for a control of causing the first laser beam to track the information track of the first information recording medium by correcting a push-pull signal obtained by subtracting a signal Ia4 from a signal Ia1 using a signal obtained by subtracting a signal Ia6 from a signal Ia3 if Ia1 to 1a6 denote signals outputted from the light receiving areas having received the first laser beam diffracted by the first to sixth transmission areas, and a second tracking error signal TEb used for a control of causing the second laser beam to track the information track of the second information recording medium by subtracting a signal obtained by adding signals Ib4, Ib5 and Ib6 from a signal obtained by adding signals Ib1, Ib2 and Ib3 if 1b1 to 1b6 denote signals outputted from the light receiving areas having received the second laser beam diffracted by the first to sixth transmission areas.

According to this construction, if Ia1 to Ia6 denote the signals outputted from the light receiving areas having received the first laser beam diffracted by the first to sixth transmission areas, the first tracking error signal TEa used for the control of causing the first laser beam to track the information track of the first information recording medium is obtained by correcting the push-pull signal obtained by subtracting the signal Ia4 from the signal Ia1 using the signal obtained by subtracting the signal Ia6 from the signal Ia3. Further, if Ib1 to Ib6 denote the signals outputted from the light receiving areas having received the second laser beam diffracted by the first to sixth transmission areas, the second tracking error signal TEb used for the control of causing the second laser beam to track the information track of the second information recording medium is obtained by subtracting the signal obtained by adding the signals Ia4, Ib5 and Ib6 from the signal obtained by adding the signals Ib1, Ib2 and Ib3.

Accordingly, the first tracking error signal can be highly accurately detected by correcting an offset of the push-pull signal obtained by subtracting the signal Ia4 from the signal Ia1 using the signal obtained by subtracting the signal Ia6 from the signal Ia3, and the second tracking error signal can be highly accurately detected by subtracting the signal obtained by adding the signals Ib4, Ib5 and Ib6 from the signal obtained by adding the signals Ib1, Ib2 and Ib3.

In the above optical head, the light receiving portion preferably obtains the first tracking error signal TEa used for the control of causing the first laser beam to track the information track of the first information recording medium in accordance with an operational equation: $TEa=(Ia1-Ia4)-k(Ia3-Ia6)$ (where k is a constant) if Ia1 to 1a6 denote the signals outputted from the light receiving areas having received the first laser beam diffracted by the first to sixth transmission areas, and the second tracking error signal TEb used for a control of causing the second laser beam to track the information track of the second information recording medium in accordance with an operational equation: $TEb=Ib1+Ib2+Ib3-Ib4-Ib5-Ib6$ if 1b1 to 1b6 denote the signals outputted from the light receiving areas having received the second laser beam diffracted by the first to sixth transmission areas.

According to this construction, if Ia1 to 1a6 denote the signals outputted from the light receiving areas having received the first laser beam diffracted by the first to sixth transmission areas, the first tracking error signal TEa used for the control of causing the first laser beam to track the information track of the first information recording medium is obtained in accordance with the operational equation: $TEa=(Ia1-Ia4)-k(Ia3-Ia6)$ (where k is a constant). Further, if the 1b1 to 1b6 denote the signals outputted from the light receiving areas having received the second laser beam diffracted by the first to sixth transmission areas, the second tracking error signal TEb used for the control of causing the second laser beam to track the information track of the second information recording medium is obtained in accordance with the operational equation: $TEb=Ib1+Ib2+Ib3-Ib4-Ib5-Ib6$.

Accordingly, the first tracking error signal can be highly accurately detected by correcting the offset of the push-pull signal obtained from the signal (Ia1−Ia4) using the signal (Ia3−Ia6), and the second tracking error signal can be highly accurately detected by subtracting the signal (Ib4+Ib5+Ib6) from the signal (Ib1+Ib2+Ib3).

In the above optical head, the light receiving portion preferably obtains a first tracking error signal TEa used for a control of causing the first laser beam to track the information track of the first information recording medium by correcting a push-pull signal obtained by subtracting a signal Ia4 from a signal Ia1 using a signal obtained by subtracting a signal Ia6 from a signal Ia3 if Ia1 to 1a6 denote signals outputted from the light receiving areas having received the first laser beam diffracted by the first to sixth transmission areas, and a second tracking error signal TEb used for a control of causing the second laser beam to track the information track of the second information recording medium by subtracting a signal obtained by adding signals Ib4, Ib5 from a signal obtained by adding signals Ib1, Ib2 if 1b1 to 1b6 denote signals outputted from the light receiving areas having received the second laser beam diffracted by the first to sixth transmission areas.

According to this construction, if Ia1 to Ia6 denote the signals outputted from the light receiving areas having received the first laser beam diffracted by the first to sixth transmission areas, the first tracking error signal TEa used for the control of causing the first laser beam to track the information track of the first information recording medium is obtained by correcting the push-pull signal obtained by subtracting the signal Ia4 from the signal Ia1 using the signal obtained by subtracting the signal Ia6 from the signal Ia3. Further, if Ib1 to Ib6 denote the signals outputted from the light receiving areas having received the second laser beam diffracted by the first to sixth transmission areas, the second tracking error signal TEb used for the control of causing the second laser beam to track the information track of the second information recording medium is obtained by subtracting the signal obtained by adding the signals Ib4, Ib5 from the signal obtained by adding the signals Ib1, Ib2.

Accordingly, the first tracking error signal can be highly accurately detected by correcting an offset of the push-pull signal obtained by subtracting the signal Ia4 from the signal Ia1 using the signal obtained by subtracting the signal Ia6 from the signal Ia3, and the second tracking error signal can be highly accurately detected by subtracting the signal obtained by adding the signals Ib4, Ib5 from the signal obtained by adding the signals Ib1, Ib2.

In the above optical head, the light receiving portion preferably obtains the first tracking error signal TEa used for the control of causing the first laser beam to track the information track of the first information recording medium in accordance with an operational equation: $TEa=(Ia1-Ia4)-k(Ia3-Ia6)$ (where k is a constant) if Ia1 to 1a6 denote the signals outputted from the light receiving areas having received the first laser beam diffracted by the first to sixth transmission areas, and the second tracking error signal TEb used for the control of causing the second laser beam to track the information track of the second information recording medium in accordance with an operational equation: $TEb=Ib1+Ib2-Ib4-Ib5$ if 1b1 to 1b6 denote the signals outputted from the light receiving areas having received the second laser beam diffracted by the first to sixth transmission areas.

According to this construction, if Ia1 to 1a6 denote the signals outputted from the light receiving areas having received the first laser beam diffracted by the first to sixth transmission areas, the first tracking error signal TEa used for the control of causing the first laser beam to track the information track of the first information recording medium is obtained in accordance with the operational equation: $TEa=(Ia1-Ia4)-k(Ia3-Ia6)$ (where k is a constant). Further, if the 1b1 to 1b6 denote the signals outputted from the light receiving areas having received the second laser beam diffracted by the first to sixth transmission areas, the second tracking error signal TEb used for the control of causing the second laser beam to track the information track of the second information recording medium is obtained in accordance with the operational equation: TEb=Ib1+Ib2−Ib4−Ib5.

Accordingly, the first tracking error signal can be highly accurately detected by correcting the offset of the push-pull signal obtained from the signal (Ia1−Ia4) using the signal (Ia3−Ia6), and the second tracking error signal can be highly accurately detected by subtracting the signal (Ib4+Ib5) from the signal (Ib1+Ib2).

In the above optical head, it is preferable that the first information recording medium includes a multilayer information recording medium having at least two or more information recording layers; that the beam splitting portion transmits parts of the first and second laser beams passing therethrough while diffracting the other parts; and that the light receiving portion is formed such that light receiving areas for receiving the first laser beam reflected by a specified information recording layer of the first information recording medium and diffracted by the beam splitting portion are arranged at such positions as not to receive the first laser beam reflected by an information recording layer different from the specified information recording layer and having passed through or diffracted by the beam splitting portion.

According to this construction, the first information recording medium includes the multilayer information recording medium having at least two or more information recording layers. Further, the beam splitting portion transmits parts of the first and second laser beams passing therethrough while diffracting the other parts. The light receiving areas for receiving the first laser beam reflected by the specified information recording layer of the first information recording medium and diffracted by the beam splitting portion are arranged at such positions as not to receive the first laser beam reflected by the information recording layer different from the specified information recording layer and having passed through or diffracted by the beam splitting portion.

Accordingly, the variation of the tracking error signal can be suppressed and a stable tracking control can be executed.

In the above optical head, it is preferable that the second information recording medium includes a multilayer information recording medium having at least two or more information recording layers; that the beam splitting portion transmits parts of the first and second laser beams passing therethrough while diffracting the other parts; and that the light receiving portion is formed such that light receiving areas for receiving the second laser beam reflected by a specified information recording layer of the second information recording medium and diffracted by the beam splitting portion are arranged at such positions as not to receive the second laser beam reflected by an information recording layer different from the specified information recording layer and having passed through by the beam splitting portion.

According to this construction, the second information recording medium includes the multilayer information recording medium having at least two or more information recording layers. Further, the beam splitting portion transmits parts of the first and second laser beams passing therethrough while diffracting the other parts. The light receiving areas for receiving the second laser beam reflected by the specified information recording layer of the second information recording medium and diffracted by the beam splitting portion are arranged at such positions as not to receive the second laser beam reflected by the information recording layer different from the specified information recording layer and having passed through by the beam splitting portion.

Accordingly, the variation of the tracking error signal can be suppressed and a stable tracking control can be executed.

In the above optical head, it is preferable that the first and second light sources are separate elements, and that an optical path combining portion for substantially aligning the optical axis of the first light source and that of the second light source is further provided.

According to this construction, the first and second light sources are separate elements, and the optical axis of the first light source and that of the second light source are substantially aligned by the optical path combining portion. Thus, the first and second laser beams emitted from different positions can be incident on the same objective lens.

An optical head according to another aspect of the present invention comprises a first light source for emitting a first laser beam having a first wavelength; a second light source for emitting a second laser beam having a first wavelength; an objective lens for focusing the first laser beam on a first information recording medium and focusing the second laser beam on a second information recording medium different from the first information recording medium; a beam splitting portion arranged on an optical path common to the first laser beam reflected and diffracted by the first information recording medium and the second laser beam reflected and diffracted by the second information recording medium for splitting the respective laser beams into a plurality of beams; and a light receiving portion for receiving the plurality of beams divided by the beam splitting portion, wherein the beam splitting portion includes a first area and a second area divided by a first division line passing through the optical axis of the objective lens and parallel to an information track of the first information recording medium in an area where the beam reflected and diffracted by the first information recording medium passes, a first division area for receiving many $1^{st}$-diffracted lights from the first information recording medium in the first area, a second division area for receiving many $1^{st}$-order diffracted lights from the first information recording medium in the second area, a third division area closer to the optical axis than the first division area in the first area and outside the first division area, a fourth division area closer to the optical axis than the second division area in the second area and outside the second division area, a fifth division area in the first area and outside the first and third division areas, and a sixth division area in the second area and outside the second and fourth division areas.

According to this construction, the first laser beam having the first wavelength is emitted from the first light source, and the second laser beam having the second wavelength is emitted from the second light source. By the objective lens, the first laser beam is focused on the first information recording medium and the second laser beam is focused on the second information recording medium different from the first information recording medium. The respective laser beams are split into a plurality of beams by the beam splitting portion arranged on the optical path common to the first laser beam reflected and diffracted by the first information recording medium and the second laser beam reflected and diffracted by the second information recording medium. The plurality of beams split by the beam splitting portion are received by the light receiving portion. The beam splitting portion includes the first and second areas divided by the first division line passing through the optical axis of the objective lens and parallel to the information track of the first information recording medium in the area where the beam reflected and diffracted by the first information recording medium passes. The beam splitting portion further includes the first division area in the first area for receiving more $1^{st}$-diffracted lights from the first information recording medium than the other division areas in the first area, the second division area in the second area for receiving more $1^{st}$-order diffracted lights from the first information recording medium than the other division areas in the second area, the third division area closer to the optical axis than the first division area in the first area and outside the first division area, the fourth division area closer to the optical axis than the second division area in the second area and outside the second division area, the fifth division area in the first area and outside the first and third division areas, and the sixth division area in the second area and outside the second and fourth division areas.

Accordingly, a tracking error signal for tracking the first information recording medium is detected based on the first laser beam having passed the first, second, fifth and sixth division areas, and a tracking error signal for tracking the second information recording medium is detected based on the second laser beam having passed the first, second, third and fourth division areas. Therefore, tracking error signals can be suitably detected for different types of optical discs.

An optical disc device according to another aspect of the present invention comprises the above optical head, a motor for driving and rotating an information recording medium, and a controller for controlling the optical head and the motor.

According to this construction, satisfactory recording or reproduction can be carried out for information recording media corresponding to a plurality of light sources since any one of the above optical heads is installed.

The optical head of the present invention can satisfactorily record or reproduce information on or from high-density optical discs, DVDs and CDs. Further, the construction of the optical head is simplified, wherefore operability can be achieved and inexpensive optical disc devices can be provided.

Further, since computers, optical disc players, optical disc recorders including the optical disc device of the present invention can satisfactorily record or reproduce information on or from different types of optical discs, they have an effect of being widely applicable.

This application is based on patent application No. 2006-289820 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical head, comprising:
a first light source for emitting a first laser beam having a first wavelength between 350 nm and 450 nm;
a second light source for emitting a second laser beam having a first wavelength between 600 nm and 700 nm;
an objective lens for focusing the first laser beam on a first information recording medium and focusing the second laser beam on a second information recording medium different from the first information recording medium;
a beam splitting portion arranged on an optical path common to the first laser beam reflected and diffracted by the first information recording medium and the second laser beam reflected and diffracted by the second information recording medium for splitting the respective laser beams into a plurality of beams; and
a light receiving portion for receiving the plurality of beams divided by the beam splitting portion, wherein:
the beam splitting portion includes a first area and a second area divided by a first line passing through the optical axis of the objective lens and parallel to an information track of the first information recording medium in an area where the beam reflected and diffracted by the first information recording medium passes;
the first area includes a first transmission area for transmitting many $1^{st}$-order diffracted lights from the first information recording medium, a second transmission area adjacent to the first transmission area and closer to the optical axis than the first transmission area and a third transmission area adjacent to the first and second transmission areas; and
the second area includes a fourth transmission area for transmitting many $1^{st}$-order diffracted lights from the first information recording medium, a fifth transmission area adjacent to the fourth transmission area and closer to the optical axis than the fourth transmission area and a sixth transmission area adjacent to the fourth and fifth transmission areas.

2. An optical head according to claim 1, wherein:
the beam splitting portion is divided into the first to sixth transmission areas by the first line, second and third lines intersecting with the first line, a fourth line intersecting with the second and third lines in the first area, and a fifth line intersecting with the second and third lines in the second area;
the first transmission area is formed at the inner sides of the second and third lines and at the outer side of the fourth line;
the second transmission area is formed at the inner sides of the second, third and fourth lines;
the third transmission area is formed at the outer sides of the second and third lines;
the fourth transmission area is formed at the inner sides of the second and third lines and at the outer side of the fifth line;
the fifth transmission area is formed at the inner sides of the second, third and fifth lines; and
the sixth transmission area is formed at the outer sides of the second and third lines.

3. An optical head according to claim 2, wherein:
the second and third lines are straight lines symmetrically located with respect to the optical axis of the objective lens and perpendicularly intersecting with the first line; and
the fourth and fifth lines are symmetrically shaped with respect to the optical axis of the objective lens.

4. An optical head according to claim 1, wherein the light receiving portion includes at least one or more common light receiving areas for receiving both first and second laser beams and receiving both the first laser beam and the second laser beam split by the beam splitting portion.

5. An optical head according to claim 1, wherein the beam splitting portion is driven together with the objective lens.

6. An optical head according to claim 1, wherein the beam splitting portion is a diffractive element for transmitting parts of the first and second laser beams passing therethrough while diffracting the other parts.

7. An optical head according to claim 6, wherein the diffractive element includes a polarizing hologram element for substantially entirely transmitting the first and second laser beams respectively emitted from the first and second light sources and transmitting parts of the first and second laser beams reflected and diffracted by the first and second information recording media while diffracting the other parts.

8. An optical head according to claim 6, wherein the diffractive element has a blaze-shaped cross section.

9. An optical head according to claim 1, wherein the light receiving portion obtains:
a first tracking error signal TEa used for a control of causing the first laser beam to track the information track of the first information recording medium by correcting a push-pull signal obtained by subtracting a signal Ia4 from a signal Ia1 using a signal obtained by subtracting a signal Ia6 from a signal Ia3 if Ia1 to 1a6 denote signals outputted from the light receiving areas having received the first laser beam diffracted by the first to sixth transmission areas, and
a second tracking error signal TEb used for a control of causing the second laser beam to track the information track of the second information recording medium by subtracting a signal obtained by adding signals Ib4, Ib5 and 1b6 from a signal obtained by adding signals Ib1, Ib2 and Ib3 if 1b1 to 1b6 denote signals outputted from the light receiving areas having received the second laser beam diffracted by the first to sixth transmission areas.

10. An optical head according to claim 9, wherein:
the light receiving portion obtains the first tracking error signal TEa used for the control of causing the first laser beam to track the information track of the first information recording medium in accordance with an operational equation: $TEa=(Ia1-Ia4)-k(Ia3-Ia6)$ (where k is a constant) if Ia1 to 1a6 the denote the signals outputted from the light receiving areas having received the first laser beam diffracted by the first to sixth transmission areas, and
the second tracking error signal TEb used for the control of causing the second laser beam to track the information track of the second information recording medium in accordance with an operational equation: $TEb=Ib1+Ib2+Ib3-Ib4-Ib5-Ib6$ if 1b1 to 1b6 denote the signals outputted from the light receiving areas having received the second laser beam diffracted by the first to sixth transmission areas.

11. An optical head according to claim 1, wherein the light receiving portion obtains:
a first tracking error signal TEa used for a control of causing the first laser beam to track the information track of the first information recording medium by correcting a push-pull signal obtained by subtracting a signal Ia4 from a signal Ia1 using a signal obtained by subtracting a signal Ia6 from a signal Ia3 if Ia1 to 1a6 denote signals outputted from the light receiving areas having received the first laser beam diffracted by the first to sixth transmission areas, and
a second tracking error signal TEb used for a control of causing the second laser beam to track the information track of the second information recording medium by subtracting a signal obtained by adding signals Ib4, Ib5 from a signal obtained by adding signals Ib1, Ib2 if 1b1 to 1b6 denote signals outputted from the light receiving areas having received the second laser beam diffracted by the first to sixth transmission areas.

12. An optical head according to claim 11, wherein the light receiving portion obtains the first tracking error signal TEa used for the control of causing the first laser beam to track the information track of the first information recording medium in accordance with an operational equation: $TEa=(Ia1-Ia4)-k(Ia3-Ia6)$ (where k is a constant) if Ia1 to 1a6 denote the signals outputted from the light receiving areas having received the first laser beam diffracted by the first to sixth transmission areas, and
the second tracking error signal TEb used for the control of causing the second laser beam to track the information track of the second information recording medium in accordance with an operational equation: $TEb=Ib1+Ib2-Ib4-Ib5$ if 1b1 to 1b6 denote the signals outputted from the light receiving areas having received the second laser beam diffracted by the first to sixth transmission areas.

13. An optical head according to claim 1, wherein:
the first information recording medium includes a multilayer information recording medium having at least two or more information recording layers;
the beam splitting portion transmits parts of the first and second laser beams passing therethrough while diffracting the other parts;
the light receiving portion is formed such that light receiving areas for receiving the first laser beam reflected by a specified information recording layer of the first information recording medium and diffracted by the beam splitting portion are arranged at such positions as not to receive the first laser beam reflected by an information recording layer different from the specified information recording layer and having passed through or diffracted by the beam splitting portion.

14. An optical head according to claim 1, wherein:
the second information recording medium includes a multilayer information recording medium having at least two or more information recording layers;
the beam splitting portion transmits parts of the first and second laser beams passing therethrough while diffracting the other parts; and
the light receiving portion is formed such that light receiving areas for receiving the second laser beam reflected by a specified information recording layer of the second information recording medium and diffracted by the beam splitting portion are arranged at such positions as not to receive the second laser beam reflected by an information recording layer different from the specified information recording layer and having passed through by the beam splitting portion.

15. An optical head according to claim 1, wherein:
the first and second light sources are separate elements; and
the optical head further comprises an optical path combining portion for substantially aligning the optical axis of the first light source and that of the second light source.

16. An optical disc device, comprising:
an optical head according to claim 1,
a motor for driving and rotating an information recording medium, and
a controller for controlling the optical head and the motor.

17. An optical head, comprising:
a first light source for emitting a first laser beam having a first wavelength;
a second light source for emitting a second laser beam having a first wavelength;
an objective lens for focusing the first laser beam on a first information recording medium and focusing the second laser beam on a second information recording medium different from the first information recording medium;
a beam splitting portion arranged on an optical path common to the first laser beam reflected and diffracted by the first information recording medium and the second laser beam reflected and diffracted by the second information recording medium for splitting the respective laser beams into a plurality of beams; and
a light receiving portion for receiving the plurality of beams divided by the beam splitting portion, wherein the beam splitting portion includes:

a first area and a second area divided by a first division line passing through the optical axis of the objective lens and parallel to an information track of the first information recording medium in an area where the beam reflected and diffracted by the first information recording medium passes, a first division area for receiving many $1^{st}$-diffracted lights from the first information recording medium in the first area, a second division area for receiving many $1^{st}$-order diffracted lights from the first information recording medium in the second area, a third division area closer to the optical axis than the first division area in the first area and outside the first division area, a fourth division area closer to the optical axis than the second division area in the second area and outside the second division area, a fifth division area in the first area and outside the first and third division areas, and a sixth division area in the second area and outside the second and fourth division areas.

* * * * *